(12) United States Patent  
Wang et al.

(10) Patent No.: US 11,388,576 B2  
(45) Date of Patent: Jul. 12, 2022

(54) EMERGENCY CALL METHOD AND APPARATUS, AND SYSTEM

(71) Applicant: Huawei Technologies Co., Ltd., Shenzhen (CN)

(72) Inventors: Xuehuan Wang, Chengdu (CN); Chao Li, Chengdu (CN); Xiujiang Ma, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/343,319

(22) Filed: Jun. 9, 2021

(65) Prior Publication Data

US 2021/0345083 A1    Nov. 4, 2021

Related U.S. Application Data

(63) Continuation of application No. PCT/CN2019/125753, filed on Dec. 16, 2019.

(51) Int. Cl.
| | |
|---|---|
| *H04W 4/90* | (2018.01) |
| *H04W 4/44* | (2018.01) |
| *H04W 24/04* | (2009.01) |
| *H04W 72/04* | (2009.01) |
| *H04W 76/50* | (2018.01) |

(52) U.S. Cl.
CPC ............... *H04W 4/90* (2018.02); *H04W 4/44* (2018.02); *H04W 24/04* (2013.01); *H04W 72/048* (2013.01); *H04W 76/50* (2018.02)

(58) Field of Classification Search
CPC ......... H04W 4/90; H04W 4/44; H04W 24/04; H04W 72/048; H04W 76/50; H04L 12/40
See application file for complete search history.

(56) References Cited

U.S. PATENT DOCUMENTS

| | | | |
|---|---|---|---|
| 9,952,948 B2 * | 4/2018 | Samii | G06F 11/2041 |
| 2011/0065935 A1 | 3/2011 | Clark et al. | |
| 2014/0200740 A1 * | 7/2014 | Lavi | G06F 17/00 701/2 |
| 2016/0034416 A1 | 2/2016 | Chavez et al. | |
| 2017/0220502 A1 | 4/2017 | Kessler et al. | |
| 2017/0199840 A1 * | 7/2017 | Suzuki | G06F 1/08 |
| 2017/0317515 A1 * | 11/2017 | Satake | B60R 16/03 |
| 2018/0060269 A1 | 3/2018 | Kessler | |
| 2018/0259974 A1 * | 9/2018 | Lei | H04L 43/062 |
| 2018/0295011 A1 * | 10/2018 | Wang | H04L 12/12 |

(Continued)

FOREIGN PATENT DOCUMENTS

| | | |
|---|---|---|
| CN | 101902281 A | 12/2010 |
| CN | 106131765 A | 11/2016 |

(Continued)

*Primary Examiner* — Charles N Appiah  
*Assistant Examiner* — Frank E Donado  
(74) *Attorney, Agent, or Firm* — Conley Rose, P.C.

(57) ABSTRACT

An emergency call method applied to a vehicle-mounted communications system and the method includes a telematics box that activates a host function. The host function includes controlling a first transmission node and a peripheral connected to the first transmission node. The telematics box is coupled to the first transmission node, and the telematics box may perform data transmission with the first transmission node using the host function. The first transmission node is in a master node mode.

21 Claims, 16 Drawing Sheets

(56) References Cited

U.S. PATENT DOCUMENTS

2019/0227971 A1 7/2019 O'Shea et al.
2019/0238425 A1 8/2019 Miladin et al.

FOREIGN PATENT DOCUMENTS

| CN | 106411611 A | 2/2017 |
| CN | 106878125 A | 6/2017 |
| CN | 107025200 A | 8/2017 |
| CN | 109952741 A | 6/2019 |
| GB | 1433117 A | 4/1976 |
| GB | 1433118 A | 4/1976 |
| KR | 20110030260 A | 3/2011 |
| WO | 9750063 A2 | 12/1997 |
| WO | 2019032801 A1 | 2/2019 |

\* cited by examiner

EMERGENCY CALL METHOD AND APPARATUS, AND SYSTEM

CROSS-REFERENCE TO RELATED APPLICATIONS

This is a continuation of International Patent Application No. PCT/CN2019/125753 filed on Dec. 16, 2019, which is hereby incorporated by reference in its entirety.

TECHNICAL FIELD

This application relates to the field of communications technologies, and in particular, to an emergency call method and apparatus, and a system.

BACKGROUND

With continuous development of the automobile industry, an automobile has more functions. For example, an audio system of a vehicle may implement functions such as active noise reduction and an emergency call. To implement these functions, the audio system generally includes the following devices: an external device, a digital transmission system connected to the external device, and the like. The external device may be a speaker, a microphone (MIC), a power amplifier (or an external power amplifier) configured to drive a high-power speaker, or the like. The digital transmission system may include one host, one master node, and one or more slave nodes. The master node is a main control node of the digital transmission system. One end of the master node is connected to the host and the other end of the master node is connected to the slave node. A plurality of slave nodes may be connected level by level, as shown in FIG. 1. The master node and the slave node may be connected to the external device (such as a MIC array and the speaker). A telematics box may be connected to the audio system by using any slave node. The telematics box is configured to implement communication between the vehicle and the outside, for example, communication between the vehicle and a base station, communication between the vehicle and a roadside station, and communication between the vehicle and another vehicle.

The host may process data transmitted by the external device or the telematics box. For example, audio data collected by the microphone is used as an example. The microphone collects the audio data and transmits the audio data to the slave node. The slave node sends the audio data to the master node, and the master node forwards the audio data to the host for processing. FIG. 1 is used as an example, and a transmission path may be described as a slave node 2→a slave node 1→a slave node 0→the master node→the host. The master node encapsulates a processing result of the host and sends the result to the slave node. The slave node may receive data corresponding to the slave node, and control, based on the data, an external device connected to the slave node. For example, the audio data is used as an example. The audio data is sent from the host to the master node, and then is transmitted to speakers of the slave nodes. FIG. 1 is used as an example, and a transmission path may be described as the host→the master node→the slave node 0→the slave node 1→the slave node 2.

In an emergency, the telematics box may collect location information, in-vehicle voice collected by the MIC array, and information about various sensors (such as an airbag), and transmit the information back to an emergency center by using an emergency call (eCall) function. In a current audio system, when an upper-level link or node is faulty, normal working of a link at a lower level or below is affected. Therefore, when an upper-level link or node of the slave node connected to the telematics box in the audio system is faulty, the telematics box cannot obtain data collected by the external device connected to the slave node, and cannot complete functions such as the emergency call.

SUMMARY

This application provides an emergency call method and apparatus, and a system, to resolve a problem where a function such as an emergency call cannot be completed when an upper-level link or node of a slave node, in an audio system, that is connected to a telematics box is faulty.

According to a first aspect, an embodiment of this application provides an emergency call method, applied to a vehicle-mounted communications system. The vehicle-mounted communications system includes a telematics box and a data communication system. The data communication system includes a first transmission node, and the telematics box is connected to the first transmission node. The method includes the telematics box activates a host function. The host function includes controlling the first transmission node and a peripheral connected to the first transmission node. The telematics box may perform data transmission with the first transmission node by using the host function. The first transmission node is in a master node mode.

In this embodiment of this application, the host function is deployed on the telematics box, and the first transmission node switches from a slave node mode to the master node mode, to provide redundancy for normal working of an eCall. In this way, when a link or a node is faulty, the host function of the telematics box may receive, through the first transmission node that switches to the master node mode, data collected by the peripheral, and transmit the data back to an emergency call center. In this way, the eCall can work normally, and reliability of the eCall can be improved.

In a possible design, the telematics box may perform, with the first transmission node, data transmission on data related to emergency call communication.

In a possible design, before the telematics box performs data transmission with the first transmission node, the telematics box detects a signal for triggering an emergency call, and sends a first instruction to the first transmission node. The first instruction is used to instruct the first transmission node to switch from the slave node mode to the master node mode. In the foregoing design, the telematics box indicates the first transmission node to switch from the slave node mode to the master node mode, so that the host function of the telematics box may receive, through the first transmission node, the data collected by the peripheral, and transmit the data back to the emergency call center. In this way, the eCall can work normally, and reliability of the eCall can be improved.

In a possible design, before the telematics box performs data transmission with the first transmission node, the telematics box detects that a connection between the first transmission node and a master node in the data communication system is interrupted, and sends the first instruction to the first transmission node. The first instruction is used to instruct the first transmission node to switch from the slave node mode to the master node mode. In the foregoing design, the telematics box indicates the first transmission node to switch from the slave node mode to the master node mode, so that the host function of the telematics box may receive, through the first transmission node, the data collected by the peripheral, and transmit the data back to the emergency call center. In this way, the eCall can work normally, and reliability of the eCall can be improved.

In a possible design, before the telematics box performs data transmission with the first transmission node, the telematics box may receive a second instruction sent by the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box performs data transmission with the first transmission node, the telematics box may alternatively send a second instruction to the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box activates the host function, the telematics box detects the signal for triggering the emergency call. In the foregoing design, the telematics box activates the host function after detecting the signal for triggering the emergency call, so that the telematics box can be prevented from being affected by a fault of a link or a node in the data communication system in the emergency call communication. In this way, the eCall function can run normally.

In a possible design, before the telematics box activates the host function, the telematics box receives a third instruction sent by the first transmission node. The third instruction is used to instruct the vehicle-mounted control terminal to activate the host function, and the third instruction is sent by the first transmission node when the first transmission node detects the signal for triggering the emergency call. In the foregoing design, after detecting the signal for triggering the emergency call, the first transmission node indicates the telematics box to activate the host function, so that the telematics box can be prevented from being affected by the fault of the link or the node in the data communication system in the emergency call communication. In this way, the eCall function can run normally.

In a possible design, before the telematics box activates the host function, the telematics box detects that the connection between the first transmission node and the master node in the data communication system is interrupted. In the foregoing design, when detecting that a link or a node between the first transmission node and the master node in the data communication system is faulty, the telematics box activates the host function. In this case, the host function of the telematics box may receive, through the first transmission node that switches to the master node mode, the data collected by the peripheral, and transmit the data back to the emergency call center. In this way, the eCall can work normally, and reliability of the eCall can be improved.

In a possible design, before the telematics box activates the host function, the telematics box receives the third instruction sent by the first transmission node. The third instruction is used to instruct the vehicle-mounted control terminal to activate the host function, and the third instruction is sent by the first transmission node when the first transmission node detects that the connection between the first transmission node and the master node in the data communication system is interrupted. In the foregoing design, when detecting that the link or the node between the first transmission node and the master node in the data communication system is faulty, the first transmission node indicates the telematics box to activate the host function. In this case, the host function of the telematics box may receive, through the first transmission node that switches to the master node mode, the data collected by the peripheral, and transmit the data back to the emergency call center. In this way, the eCall can work normally, and reliability of the eCall can be improved.

In a possible design, the data communication system includes at least one second transmission node. The second transmission node is a lower-level transmission node of the first transmission node. After the telematics box activates the host function, the telematics box may allocate a transmission resource to the at least one second transmission node. The telematics box sends resource allocation information to the first transmission node. The resource allocation information is used to indicate the transmission resource separately corresponding to the at least one second transmission node. In the foregoing design, the telematics box allocates the transmission resource to the lower-level transmission node of the first transmission node, so that the lower-level transmission node of the first transmission node can work normally under control of the telematics box. In this way, the eCall can work normally, and reliability of the eCall can be improved.

In a possible design, the telematics box switches from being powered by the first transmission node to being powered by a local power supply. According to the foregoing design, the telematics box switches to being powered by the local power supply, so that the telematics box can work normally when the link or the node in the data communication system is faulty.

In a possible design, the telematics box supplies power to the first transmission node. According to the foregoing design, the telematics box switches to being powered by the local power supply and supplies power to the first transmission node, so that the first transmission node and the peripheral connected to the first transmission node can work normally.

In a possible design, the data communication system includes a third transmission node. The third transmission node is the primary transmission node in the data communication system. There may be at least two transmission paths between the first transmission node and the third transmission node. In the foregoing design, path redundancy is provided for the telematics box. When the node or the link in the data communication system is faulty, the data communication system may supply power to the telematics box through a standby path, to drive the peripheral to work normally. In this way, reliability of the eCall can be improved.

According to a second aspect, an embodiment of this application provides an emergency call method, applied to a vehicle-mounted communications system. The vehicle-mounted communications system includes a telematics box and a data communication system. The data communication system includes a first transmission node, and the telematics box is connected to the first transmission node. The method includes the first transmission node switches from a slave node mode to a master node mode. The first transmission node performs data transmission with the telematics box. The telematics box has a host function, and the host function includes a function of controlling the first transmission node and a peripheral connected to the first transmission node.

In this embodiment of this application, the host function is deployed on the telematics box, and the first transmission node switches from a slave node mode to the master node mode, to provide redundancy for normal working of an eCall. In this way, when a link or a node is faulty, the host function of the telematics box may receive, through the first transmission node that switches to the master node mode, data collected by the peripheral, and transmit the data back to an emergency call center. In this way, the eCall can work normally, and reliability of the eCall can be improved.

In a possible design, before the first transmission node switches from the slave node mode to the master node mode, the first transmission node may detect a signal for triggering an emergency call. In the foregoing design, when detecting the signal for triggering the emergency call, the first transmission node switches from the slave node mode to the master node mode, so that the host function of the telematics box may receive, through the first transmission node, the data collected by the peripheral, and transmit the data back to the emergency call center. In this way, the eCall can work normally, and reliability of the eCall can be improved.

In a possible design, before the first transmission node switches from the slave node mode to the master node mode, the first transmission node may detect that a connection between the first transmission node and a master node in the data communication system is interrupted. In the foregoing design, when detecting that the connection between the first transmission node and the master node in the data communication system is interrupted, the first transmission node switches from the slave node mode to the master node mode, so that the host function of the telematics box may receive, through the first transmission node, the data collected by the peripheral, and transmit the data back to the emergency call center. In this way, the eCall can work normally, and reliability of the eCall can be improved.

In a possible design, before the first transmission node switches from the slave node mode to the master node mode, the first transmission node may receive a first instruction sent by the telematics box. The first instruction is used to instruct the first transmission node to switch from the slave node mode to the master node mode. The first instruction may be sent by the vehicle-mount communications terminal when the telematics box detects the signal for triggering the emergency call. In the foregoing design, when detecting the signal for triggering the emergency call, the telematics box indicates the first transmission node to switch from the slave node mode to the master node mode, so that the host function of the telematics box may receive, through the first transmission node, the data collected by the peripheral, and transmit the data back to the emergency call center. In this way, it can be avoided that the eCall cannot work normally due to a fault of a link or a node in the data communication system, and reliability of the eCall can be improved.

In a possible design, before the first transmission node switches from the slave node mode to the master node mode, the first transmission node may receive the first instruction sent by the telematics box. The first instruction is used to instruct the first transmission node to switch from the slave node mode to the master node mode. The first instruction may be sent by the telematics box when the telematics box detects that the connection between the first transmission node and the master node in the data communication system is interrupted. In the foregoing design, the telematics box indicates the first transmission node to switch from the slave node mode to the master node mode when the link or the node in the data communication system is faulty, so that the host function of the telematics box may receive, through the first transmission node, the data collected by the peripheral, and transmit the data back to the emergency call center. In this way, the eCall can work normally, and reliability of the eCall can be improved.

In a possible design, before the first transmission node performs data transmission with the telematics box, the first transmission node may send a second instruction to the telematics box. The second instruction is used to implement synchronization between the first transmission node and the telematics box. According to the foregoing design, after synchronizing with the first transmission node that switches to the master node mode, the host function of the telematics box communicates with the first transmission node, to improve communication reliability.

In a possible design, the first transmission node receives the second instruction sent by the telematics box. The second instruction is used to implement synchronization between the first transmission node and the telematics box. According to the foregoing design, after synchronizing with the first transmission node that switches to the master node mode, the host function of the telematics box communicates with the first transmission node, to improve communication reliability.

In a possible design, before the first transmission node performs data transmission with the telematics box, the first transmission node detects the signal for triggering the emergency call, and sends a third instruction to the telematics box. The third instruction is used to instruct the telematics box to activate the host function. In the foregoing design, when detecting the signal for triggering the emergency call, the first transmission node indicates the telematics box to activate the host function, so that the telematics box can be prevented from being affected by the fault of the link or the node in the data communication system in emergency call communication. In this way, the eCall function can run normally.

In a possible design, before the first transmission node performs data transmission with the telematics box, the first transmission node detects that the connection between the first transmission node and the master node in the data communication system is interrupted, and sends the third instruction to the telematics box. The third instruction is used to instruct the telematics box to activate the host function. In the foregoing design, the first transmission node indicates the telematics box to activate the host function when the link or the node in the data communication system is faulty, so that the host function of the telematics box may receive, through the first transmission node, the data collected by the peripheral, and transmit the data back to the emergency call center. In this way, the eCall can work normally, and reliability of the eCall can be improved.

In a possible design, the data communication system includes at least one second transmission node. The second transmission node is a lower-level transmission node of the first transmission node. After the first transmission node switches from the slave node mode to the master node mode, the first transmission node may receive resource allocation information sent by the telematics box. The resource allocation information is used to indicate a transmission resource of the at least one second transmission node. The first transmission node separately sends configuration information to the at least one second transmission node. The configuration information is used to indicate the transmission resource corresponding to the second transmission node. In the foregoing design, the telematics box allocates the transmission resource to the lower-level transmission node of the first transmission node, so that the lower-level transmission node of the first transmission node can work normally under control of the telematics box. In this way, the eCall can work normally, and reliability of the eCall can be improved.

In a possible design, the telematics box switches from being powered by the first transmission node to being powered by a local power supply. According to the foregoing design, the telematics box switches to being powered by the local power supply, so that the telematics box can work normally when the link or the node in the data communication system is faulty.

In a possible design, the first transmission node may switch from being powered by the data communication system to be being powered by the telematics box. According to the foregoing design, the telematics box switches to being powered by the local power supply and supplies power to the first transmission node, so that the first transmission node and the peripheral connected to the first transmission node can work normally.

In a possible design, the data communication system includes a third transmission node. The third transmission node is a primary transmission node in the data communication system. There may be at least two transmission paths between the first transmission node and the third transmission node. In the foregoing design, path redundancy is provided for the telematics box. When the node or the link in the data communication system is faulty, the data communication system may supply power to the telematics box through a standby path, to drive the peripheral to work normally. In this way, reliability of the eCall can be improved.

According to a third aspect, an embodiment of this application provides an emergency call method, applied to a vehicle-mounted communications system. The vehicle-mounted communications system includes a telematics box and a data communication system. The data communication system includes a first transmission node, and the telematics box is connected to the first transmission node. The method includes the telematics box activates a first function and a second function of the telematics box. The first function includes a function of controlling the first transmission node and a peripheral connected to the first transmission node. The first transmission node is connected to the telematics box, and the first transmission node is in a slave node mode. The second function includes a function of decapsulating data from the first transmission node, and encapsulating the data and sending encapsulated data to the first transmission node. The telematics box performs data transmission with the first transmission node.

In this embodiment of this application, the first function and the second function are deployed on the telematics box, to provide redundancy for normal working of an eCall. This can improve reliability of the eCall. When a link or a node is faulty, the telematics box may receive, through the first function and the second function, data collected by the peripheral, and transmit the data back to an emergency call center. In this way, the eCall can work normally, and reliability of the eCall can be improved.

In a possible design, the telematics box supplies power to the first transmission node. According to the foregoing design, the telematics box switches to being powered by a local power supply and supplies power to the first transmission node, so that the first transmission node and the peripheral connected to the first transmission node can work normally.

In a possible design, the telematics box switches from being powered by the first transmission node to being powered by the local power supply. According to the foregoing design, the telematics box switches to being powered by the local power supply, so that the telematics box can work normally when a link or a node in the data communication system is faulty.

In a possible design, the data communication system includes a third transmission node. The third transmission node is a primary transmission node in the data communication system. There may be at least two transmission paths between the first transmission node and the third transmission node. In the foregoing design, path redundancy is provided for the telematics box. When the node or the link in the data communication system is faulty, the data communication system may supply power to the telematics box through a standby path, to drive the peripheral to work normally. In this way, reliability of the eCall can be improved.

In a possible design, before the telematics box performs data transmission with the first transmission node, the telematics box may receive a first instruction sent by the first transmission node. The first instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box performs data transmission with the first transmission node, the telematics box may alternatively send a first instruction to the first transmission node. The first instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box activates the first function and the second function, the telematics box detects a signal for triggering an emergency call. In the foregoing design, the telematics box activates the first function and the second function after detecting the signal for triggering the emergency call, so that the telematics box can be prevented from being affected by the fault of the link or the node in the data communication system in emergency call communication. In this way, the eCall function can run normally.

In a possible design, before the telematics box activates the first function and the second function, the telematics box receives a second instruction sent by the first transmission node. The second instruction is used to instruct the vehicle-mounted control terminal to activate the first function and the second function, and the second instruction is sent by the first transmission node when the first transmission node detects the signal for triggering the emergency call. In the foregoing design, after detecting the signal for triggering the emergency call, the first transmission node indicates the telematics box to activate the first function and the second function, so that the telematics box can be prevented from being affected by the fault of the link or the node in the data communication system in the emergency call communication. In this way, the eCall function can run normally.

In a possible design, before the telematics box activates the first function and the second function, the telematics box detects that a connection between the first transmission node and a master node in the data communication system is interrupted. In the foregoing design, when detecting that a link or a node between the first transmission node and the master node in the data communication system is faulty, the telematics box activates the first function and the second function. In this case, the first function and the second function of the telematics box may receive, through the first transmission node, the data collected by the peripheral, and transmit the data back to the emergency call center. In this way, the eCall can work normally, and reliability of the eCall can be improved.

In a possible design, before the telematics box activates the first function and the second function, the telematics box receives the second instruction sent by the first transmission node. The second instruction is used to instruct the vehicle-mounted control terminal to activate the first function and the second function, and the second instruction is sent by the first transmission node when the first transmission node detects that the connection between the first transmission node and the master node in the data communication system is interrupted. In the foregoing design, when detecting that the link or the node between the first transmission node and the master node in the data communication system is faulty, the first transmission node indicates the telematics box to activate the first function and the second function. In this case, the first function and the second function of the telematics box may receive, through the first transmission node, the data collected by the peripheral, and transmit the data back to the emergency call center. In this way, the eCall can work normally, and reliability of the eCall can be improved.

According to a fourth aspect, an embodiment of this application provides an emergency call method, applied to a vehicle-mounted communications system. The vehicle-mounted communications system includes a telematics box and a data communication system. The data communication system includes a first transmission node, and the telematics box is connected to the first transmission node. The method includes the first transmission node sends a first instruction to the telematics box. The first instruction is used to instruct the vehicle-mounted control terminal to activate a first function and a second function. The first transmission node is connected to the telematics box, and the first transmission node is in a slave node mode. The first function includes a function of controlling the first transmission node and a peripheral connected to the first transmission node. The second function includes a function of decapsulating data from the first transmission node, and encapsulating the data and sending encapsulated data to the first transmission node. The first transmission node performs data transmission with the telematics box.

In this embodiment of this application, the first function and the second function are deployed on the telematics box, to provide redundancy for normal working of an eCall. This can improve reliability of the eCall. When a link or a node is faulty, the telematics box may receive, through the first function and the second function, data collected by the peripheral, and transmit the data back to an emergency call center. In this way, the eCall can work normally, and reliability of the eCall can be improved.

In a possible design, the first instruction is sent by the first transmission node when the first transmission node detects a signal for triggering an emergency call.

In a possible design, the first instruction is sent by the first transmission node when the first transmission node detects that a connection between the first transmission node and a master node in the data communication system is interrupted.

In a possible design, before the first transmission node performs data transmission with the telematics box, the first transmission node may send a second instruction to the telematics box. The second instruction is used to implement synchronization between the first transmission node and the telematics box. According to the foregoing design, after synchronizing with the first transmission node that switches to a master node mode, the host function of the telematics box communicates with the first transmission node, to improve communication reliability.

In a possible design, the first transmission node receives a second instruction sent by the telematics box. The second instruction is used to implement synchronization between the first transmission node and the telematics box. According to the foregoing design, after synchronizing with the first transmission node that switches to the master node mode, the host function of the telematics box communicates with the first transmission node, to improve communication reliability.

In a possible design, the telematics box switches from being powered by the first transmission node to being powered by a local power supply. According to the foregoing design, the telematics box switches to being powered by the local power supply, so that the telematics box can work normally when a link or a node in the data communication system is faulty.

In a possible design, the telematics box supplies power to the first transmission node. According to the foregoing design, the telematics box switches to being powered by the local power supply and supplies power to the first transmission node, so that the first transmission node and the peripheral connected to the first transmission node can work normally.

In a possible design, the data communication system includes a third transmission node. The third transmission node is a primary transmission node in the data communication system. There may be at least two transmission paths between the first transmission node and the third transmission node. In the foregoing design, path redundancy is provided for the telematics box. When the node or the link in the data communication system is faulty, the data communication system may supply power to the telematics box through a standby path, to drive the peripheral to work normally. In this way, reliability of the eCall can be improved.

According to a fifth aspect, an embodiment of this application provides an emergency call system. The system includes a telematics box, a first system, a second system, and at least one peripheral. The first system includes at least one transmission node and a host. The second system includes at least one transmission node. The first system is connected to the at least one peripheral. The second system is connected to the at least one peripheral, and the second system is connected to the telematics box through a first transmission node in the second system. In this embodiment of this application, the second system is added, the first system and the second system share the peripheral, and the telematics box performs data transmission on emergency call data through the second system. In normal working, the telematics box and the first system work independently. A fault of a node or a link in the first system does not affect the telematics box. The telematics box may obtain, through the second system, data collected by the peripheral, so that the eCall function can run normally, and reliability of an eCall can be improved.

In a possible design, that the first transmission node is connected to the telematics box means that the first transmission node is connected to the telematics box in a signal connection manner and a power supply connection manner.

In a possible design, the telematics box has a first function, and the first function includes a function of controlling the transmission node and a peripheral connected to the transmission node. The first transmission node is in a master node mode. According to the foregoing design, the first function of the telematics box may receive, through the first transmission node in the master node mode, the data collected by the peripheral, so that the eCall function can run normally, and reliability of the eCall can be improved.

In a possible design, the telematics box has the first function and a second function. The first function includes the function of controlling the transmission node and the peripheral connected to the transmission node. The second function includes a function of decapsulating data from the at least one transmission node in the second system, and encapsulating the data and sending encapsulated data to the at least one transmission node in the second system. Any transmission node in the second system is in a slave node mode. According to the foregoing design, the first function and the second function of the telematics box may receive, through the first transmission node, the data collected by the peripheral, so that the eCall function can run normally, and reliability of the eCall can be improved.

In a possible design, the telematics box is connected to a second transmission node in the first system. In the foregoing design, the telematics box is connected to the first system, so that the telematics box is connected to two systems, and the two systems back up each other. When a link or a node in one system is faulty, the telematics box may obtain the data from the peripheral through the other system, to ensure normal running of the eCall function in the telematics box, and improve reliability of the eCall.

In a possible design, there are at least two transmission paths between at least two transmission nodes in the first system. In the foregoing design, path redundancy is provided for the telematics box. When a node or a link in the data communication system is faulty, the data communication system may supply power to the telematics box through a standby path, to drive the peripheral to work normally. In this way, reliability of the eCall can be improved.

In a possible design, there are at least two transmission paths between at least two transmission nodes in the second system. In the foregoing design, path redundancy is provided for the telematics box. When a node or a link in the data communication system is faulty, the data communication system may supply power to the telematics box through a standby path, to drive the peripheral to work normally. In this way, reliability of the eCall can be improved.

According to a sixth aspect, an embodiment of this application provides a vehicle. The emergency call system according to the fifth aspect may be deployed on the vehicle.

According to a seventh aspect, an embodiment of this application provides an emergency call method, applied to an emergency call system. The system includes a telematics box, a first system, a second system, and at least one peripheral. The first system includes at least one transmission node and a host. The second system includes at least one transmission node. The first system is connected to the at least one peripheral. The second system is connected to the at least one peripheral, and the second system is connected to the telematics box through a first transmission node in the second system. The method includes the telematics box determines to initiate an emergency call, and the telematics box performs data transmission with the first transmission node. In this embodiment of this application, the second system is added, the first system and the second system share the peripheral, and the telematics box performs data transmission on emergency call data through the second system. In normal working, the telematics box and the first system work independently. A fault of a node or a link in the first system does not affect the telematics box. The telematics box may obtain, through the second system, data collected by the peripheral, so that an eCall function can run normally, and reliability of the eCall can be improved.

In a possible design, that the first transmission node is connected to the telematics box means that the first transmission node is connected to the telematics box in a signal connection manner and a power supply connection manner.

In a possible design, the telematics box has a first function, and the first function includes a function of controlling the transmission node and a peripheral connected to the transmission node. The first transmission node is in a master node mode. According to the foregoing design, the first function of the telematics box may receive, through the first transmission node in the master node mode, the data collected by the peripheral, so that the eCall function can run normally, and reliability of the eCall can be improved.

In a possible design, the telematics box has the first function and a second function. The first function includes the function of controlling the transmission node and the peripheral connected to the transmission node. The second function includes a function of decapsulating data from the at least one transmission node in the second system, and encapsulating the data and sending encapsulated data to the at least one transmission node in the second system. Any transmission node in the second system is in a slave node mode. According to the foregoing design, the first function and the second function of the telematics box may receive, through the first transmission node, the data collected by the peripheral, so that the eCall function can run normally, and reliability of the eCall can be improved.

In a possible design, there are at least two transmission paths between at least two transmission nodes in the first system. In the foregoing design, path redundancy is provided for the telematics box. When a node or a link in the data communication system is faulty, the data communication system may supply power to the telematics box through a standby path, to drive the peripheral to work normally. In this way, reliability of the eCall can be improved.

In a possible design, there are at least two transmission paths between at least two transmission nodes in the second system. In the foregoing design, path redundancy is provided for the telematics box. When a node or a link in the data communication system is faulty, the data communication system may supply power to the telematics box through a standby path, to drive the peripheral to work normally. In this way, reliability of the eCall can be improved.

According to an eighth aspect, an embodiment of this application provides an emergency call method, applied to an emergency call system. The system includes a telematics box, a first system, a second system, and at least one peripheral. The first system includes at least one transmission node and a host. The second system includes at least one transmission node. The first system is connected to the at least one peripheral. The second system is connected to the at least one peripheral, and the second system is connected to the telematics box through a first transmission node in the second system. The first system is connected to the telematics box through a second transmission node in the first system. The method includes the telematics box performs data transmission with the second transmission node when the first system works normally, and the telematics box performs data transmission with the first transmission node when the first system works abnormally. In this embodiment of this application, the telematics box is connected to both the first system and the second system, so that the telematics box is connected to two systems, and the two systems back up each other. When a link or a node in one system is faulty, the telematics box may obtain data from the peripheral through the other system, to ensure normal running of an eCall function in the telematics box, and improve reliability of the eCall.

In a possible design, the telematics box has a first function, or the telematics box has the first function and a second function. The first function includes a function of controlling the first transmission node and a peripheral connected to the first transmission node, and the second function includes a function of decapsulating data from the first transmission node, and encapsulating the data and sending encapsulated data to the first transmission node.

In a possible design, the telematics box has the first function, and the first function includes a function of controlling the transmission node and a peripheral connected to the transmission node. Before the telematics box performs data transmission with the first transmission node, the telematics box detects a signal for triggering an emergency call, and sends a first instruction to the first transmission node. The first instruction is used to instruct the first transmission node to switch from a slave node mode to a master node mode. In the foregoing design, when detecting the signal for triggering the emergency call, the telematics box indicates the first transmission node to switch from the slave node mode to the master node mode, so that the host function of the telematics box may receive, through the first transmission node, the data collected by the peripheral, and transmit the data back to an emergency call center. In this way, it can be avoided that the eCall cannot work normally due to a fault of a link or a node in the first system, and reliability of the eCall can be improved.

In a possible design, the telematics box has the first function, and the first function includes a function of controlling the transmission node and a peripheral connected to the transmission node. Before the telematics box performs data transmission with the first transmission node, the telematics box detects that a connection between the first transmission node and a master node in the data communication system is interrupted, and sends the first instruction to the first transmission node. The first instruction is used to instruct the first transmission node to switch from the slave node mode to the master node mode. In the foregoing design, the telematics box indicates the first transmission node to switch from the slave node mode to the master node mode when the connection between the first transmission node and the master node in the data communication system is interrupted, so that the host function of the telematics box may receive, through the first transmission node, the data collected by the peripheral, and transmit the data back to the emergency call center. In this way, the eCall can work normally, and reliability of the eCall can be improved.

In a possible design, before the telematics box performs data transmission with the first transmission node, the telematics box may receive a second instruction sent by the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box performs data transmission with the first transmission node, the telematics box may alternatively send a second instruction to the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, the second system includes at least one third transmission node. The third transmission node is a lower-level transmission node of the first transmission node. After the telematics box activates the host function, the telematics box may allocate a transmission resource to the at least one third transmission node. The telematics box sends resource allocation information to the first transmission node. The resource allocation information is used to indicate the transmission resource separately corresponding to the at least one third transmission node. In the foregoing design, the telematics box allocates the transmission resource to the lower-level transmission node of the first transmission node, so that the lower-level transmission node of the first transmission node can work normally under control of the telematics box. In this way, the eCall can work normally, and reliability of the eCall can be improved.

In a possible design, the first system includes at least one fourth transmission node. The fourth transmission node is a lower-level transmission node of the second transmission node. After the telematics box activates the host function, the telematics box may allocate a transmission resource to the at least one fourth transmission node. The telematics box sends resource allocation information to the second transmission node. The resource allocation information is used to indicate the transmission resource separately corresponding to the at least one fourth transmission node. In the foregoing design, the telematics box allocates the transmission resource to the lower-level transmission node of the second transmission node, so that the lower-level transmission node of the second transmission node can work normally under control of the telematics box. In this way, the eCall can work normally, and reliability of the eCall can be improved.

In a possible design, the telematics box switches from being powered by the first transmission node to being powered by a local power supply. According to the foregoing design, the telematics box switches to being powered by the local power supply, so that the telematics box can work normally when a link or a node in the data communication system is faulty.

In a possible design, the telematics box supplies power to the first transmission node. According to the foregoing design, the telematics box switches to being powered by the local power supply and supplies power to the first transmission node, so that the first transmission node and the peripheral connected to the first transmission node can work normally.

In a possible design, the telematics box supplies power to the second transmission node. According to the foregoing design, the telematics box switches to being powered by the local power supply and supplies power to the second transmission node, so that the second transmission node and a peripheral connected to the second transmission node can work normally.

In a possible design, the first system includes a first primary transmission node, and there may be at least two transmission paths between the second transmission node and the first primary transmission node. In the foregoing design, the first system provides path redundancy for the telematics box. When a node or a link in the first system is faulty, the first system may supply power to the telematics box through a standby path, to drive the peripheral to work normally. In this way, reliability of the eCall can be improved.

In a possible design, the second system includes a second primary transmission node, and there may be at least two transmission paths between the first transmission node and the second primary transmission node. In the foregoing design, the second system provides path redundancy for the telematics box. When a node or a link in the second system is faulty, the second system may supply power to the telematics box through a standby path, to drive the peripheral to work normally. In this way, reliability of the eCall can be improved.

According to a ninth aspect, an embodiment of this application provides an emergency call method, applied to an emergency call system. The system includes a telematics box, a first system, a second system, and at least one peripheral. The first system includes at least one transmission node and a host. The second system includes at least one transmission node. The first system is connected to the at least one peripheral. The second system is connected to the at least one peripheral, and the second system is connected to the telematics box through a first transmission node in the second system. The first system is connected to the telematics box through a second transmission node in the first system. The method includes the telematics box performs data transmission with the first transmission node when the second system works normally, and the telematics box performs data transmission with the second transmission node when the second system works abnormally. In this embodiment of this application, the telematics box is connected to both the first system and the second system, so that the telematics box is connected to two systems, and the two systems back up each other. When a link or a node in one system is faulty, the telematics box may obtain data from the peripheral through the other system, to ensure normal running of an eCall function in the telematics box, and improve reliability of the eCall.

In a possible design, the telematics box has a first function, or the telematics box has the first function and a second function. The first function includes a function of controlling the first transmission node and a peripheral connected to the first transmission node, and the second function includes a function of decapsulating data from the first transmission node, and encapsulating data and sending encapsulated data to the first transmission node.

In a possible design, the telematics box has the first function, and the first function includes a function of controlling the transmission node and a peripheral connected to the transmission node. Before the telematics box performs data transmission with the first transmission node, the telematics box detects a signal for triggering an emergency call, and sends a first instruction to the first transmission node. The first instruction is used to instruct the first transmission node to switch from a slave node mode to a master node mode. In the foregoing design, when detecting the signal for triggering the emergency call, the telematics box indicates the first transmission node to switch from the slave node mode to the master node mode, so that the host function of the telematics box may receive, through the first transmission node, the data collected by the peripheral, and transmit the data back to an emergency call center. In this way, it can be avoided that the eCall cannot work normally due to a fault of a link or a node in the first system, and reliability of the eCall can be improved.

In a possible design, the telematics box has the first function, and the first function includes the function of controlling the transmission node and the peripheral connected to the transmission node. Before the telematics box performs data transmission with the first transmission node, the telematics box detects that a connection between the first transmission node and a master node in the data communication system is interrupted, and sends the first instruction to the first transmission node. The first instruction is used to instruct the first transmission node to switch from the slave node mode to the master node mode. In the foregoing design, the telematics box indicates the first transmission node to switch from the slave node mode to the master node mode when the connection between the first transmission node and the master node in the data communication system is interrupted, so that the host function of the telematics box may receive, through the first transmission node, the data collected by the peripheral, and transmit the data back to the emergency call center. In this way, the eCall can work normally, and reliability of the eCall can be improved.

In a possible design, before the telematics box performs data transmission with the first transmission node, the telematics box may receive a second instruction sent by the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, before the telematics box performs data transmission with the first transmission node, the telematics box may alternatively send a second instruction to the first transmission node. The second instruction is used to implement synchronization between the telematics box and the first transmission node. According to the foregoing design, after synchronizing with the first transmission node that switches to the master node mode, the host function of the telematics box communicates with the first transmission node, to improve communication reliability.

In a possible design, the second system includes at least one third transmission node. The third transmission node is a lower-level transmission node of the first transmission node. After the telematics box activates the host function, the telematics box may allocate a transmission resource to the at least one third transmission node. The telematics box sends resource allocation information to the first transmission node. The resource allocation information is used to indicate the transmission resource separately corresponding to the at least one third transmission node. In the foregoing design, the telematics box allocates the transmission resource to the lower-level transmission node of the first transmission node, so that the lower-level transmission node of the first transmission node can work normally under control of the telematics box. In this way, the eCall can work normally, and reliability of the eCall can be improved.

In a possible design, the first system includes at least one fourth transmission node. The fourth transmission node is a lower-level transmission node of the second transmission node. After the telematics box activates the host function, the telematics box may allocate a transmission resource to the at least one fourth transmission node. The telematics box sends resource allocation information to the second transmission node. The resource allocation information is used to indicate the transmission resource separately corresponding to the at least one fourth transmission node. In the foregoing design, the telematics box allocates the transmission resource to the lower-level transmission node of the second transmission node, so that the lower-level transmission node of the second transmission node can work normally under control of the telematics box. In this way, the eCall can work normally, and reliability of the eCall can be improved.

In a possible design, the telematics box switches from being powered by the first transmission node to being powered by a local power supply. According to the foregoing design, the telematics box switches to being powered by the local power supply, so that the telematics box can work normally when a link or a node in the data communication system is faulty.

In a possible design, the telematics box supplies power to the first transmission node. According to the foregoing design, the telematics box switches to being powered by the local power supply and supplies power to the first transmission node, so that the first transmission node and the peripheral connected to the first transmission node can work normally.

In a possible design, the telematics box supplies power to the second transmission node. According to the foregoing design, the telematics box switches to being powered by the local power supply and supplies power to the second transmission node, so that the second transmission node and a peripheral connected to the second transmission node can work normally.

In a possible design, the first system includes a first primary transmission node, and there may be at least two transmission paths between the second transmission node and the first primary transmission node. In the foregoing design, the first system provides path redundancy for the telematics box. When a node or a link in the first system is faulty, the first system may supply power to the telematics box through a standby path, to drive the peripheral to work normally. In this way, reliability of the eCall can be improved.

In a possible design, the second system includes a second primary transmission node, and there may be at least two transmission paths between the first transmission node and the second primary transmission node. In the foregoing design, the second system provides path redundancy for the telematics box. When a node or a link in the second system is faulty, the second system may supply power to the telematics box through a standby path, to drive the peripheral to work normally. In this way, reliability of the eCall can be improved.

According to a tenth aspect, this application provides an emergency call apparatus. The apparatus may be a communications device, or may be a chip or a chipset in a communications device. The communications device may be a telematics box or a transmission node. The apparatus may include a processing unit and a transceiver unit. When the apparatus is the communications device, the processing unit may be a processor, and the transceiver unit may be a transceiver. The apparatus may further include a storage module, and the storage module may be a memory. The storage module is configured to store an instruction. The processing unit executes the instruction stored in the storage module, so that the telematics box is enabled to perform corresponding functions in the first aspect, the third aspect, the seventh aspect, the eighth aspect, and the ninth aspect. Alternatively, the processing unit executes the instruction stored in the storage module, so that the transmission node is enabled to perform corresponding functions in the second aspect and the fourth aspect. When the apparatus is the chip or the chipset in the communications device, the processing unit may be a processor, and the transceiver unit may be an input/output interface, a pin, a circuit, or the like. The processing unit executes an instruction stored in a storage module, so that the telematics box is enabled to perform corresponding functions in the first aspect, the third aspect, the seventh aspect, the eighth aspect, and the ninth aspect. Alternatively, the processing unit executes the instruction stored in the storage module, so that the transmission node is enabled to perform corresponding functions in the second aspect and the fourth aspect. The storage module may be a storage module (for example, a register or a cache) in the chip or the chip set, or may be a storage module (for example, a read-only memory (ROM) or a random-access memory (RAM)) that is in the network device and that is located outside the chip or the chipset.

According to an eleventh aspect, an emergency call apparatus is provided, including a processor, a communications interface, and a memory. The communications interface is configured to transmit information, and/or a message, and/or data between the apparatus and another apparatus. The memory is configured to store a computer-executable instruction. When the apparatus runs, the processor executes the computer-executable instruction stored in the memory, so that the apparatus is enabled to perform the emergency call method according to any one of the first aspect or the designs of the first aspect, any one of the second aspect or the designs of the second aspect, any one of the third aspect or the designs of the third aspect, any one of the fourth aspect or the designs of the fourth aspect, any one of the fifth aspect or the designs of the fifth aspect, any one of the sixth aspect or the designs of the sixth aspect, any one of the seventh aspect or the designs of the seventh aspect, any one of the eighth aspect or the designs of the eighth aspect, or any one of the ninth aspect or the designs of the ninth aspect.

According to a twelfth aspect, this application further provides a computer-readable storage medium. The computer-readable storage medium stores an instruction. When the instruction is run on a computer, the computer is enabled to perform the emergency call method according to any one of the first aspect or the designs of the first aspect, any one of the second aspect or the designs of the second aspect, any one of the third aspect or the designs of the third aspect, any one of the fourth aspect or the designs of the fourth aspect, any one of the fifth aspect or the designs of the fifth aspect, any one of the sixth aspect or the designs of the sixth aspect, any one of the seventh aspect or the designs of the seventh aspect, any one of the eighth aspect or the designs of the eighth aspect, or any one of the ninth aspect or the designs of the ninth aspect.

According to a thirteenth aspect, this application further provides a computer program product including an instruction. When the computer program product runs on a computer, the computer is enabled to perform the emergency call method according to any one of the first aspect or the designs of the first aspect, any one of the second aspect or the designs of the second aspect, any one of the third aspect or the designs of the third aspect, any one of the fourth aspect or the designs of the fourth aspect, any one of the fifth aspect or the designs of the fifth aspect, any one of the sixth aspect or the designs of the sixth aspect, any one of the seventh aspect or the designs of the seventh aspect, any one of the eighth aspect or the designs of the eighth aspect, or any one of the ninth aspect or the designs of the ninth aspect.

According to a fourteenth aspect, this application further provides an emergency call system. The network system includes a telematics box and a transmission node. The telematics box may perform a corresponding function in the first aspect, and the transmission node may perform a corresponding function in the second aspect. Alternatively, the telematics box may perform a corresponding function in the third aspect, and the transmission node may perform a corresponding function in the fourth aspect.

According to a fifteenth aspect, an embodiment of this application provides a chip. The chip includes a memory, at least one processor, and a communications interface. The processor is coupled to the memory, and is configured to read a computer program stored in the memory to perform the emergency call method according to any one of the first aspect or the designs of the first aspect, any one of the second aspect or the designs of the second aspect, any one of the third aspect or the designs of the third aspect, any one of the fourth aspect or the designs of the fourth aspect, any one of the fifth aspect or the designs of the fifth aspect, any one of the sixth aspect or the designs of the sixth aspect, any one of the seventh aspect or the designs of the seventh aspect, any one of the eighth aspect or the designs of the eighth aspect, or any one of the ninth aspect or the designs of the ninth aspect in the embodiments of this application.

According to a sixteenth aspect, an embodiment of this application provides a chip, including a communications interface and at least one processor. The processor runs to perform the emergency call method according to any one of the first aspect or the designs of the first aspect, any one of the second aspect or the designs of the second aspect, any one of the third aspect or the designs of the third aspect, any one of the fourth aspect or the designs of the fourth aspect, any one of the fifth aspect or the designs of the fifth aspect, any one of the sixth aspect or the designs of the sixth aspect, any one of the seventh aspect or the designs of the seventh aspect, any one of the eighth aspect or the designs of the eighth aspect, or any one of the ninth aspect or the designs of the ninth aspect in the embodiments of this application.

It should be noted that "coupling" in the embodiments of this application indicates a direct combination or an indirect combination between two components.

DESCRIPTION OF EMBODIMENTS

With continuous development of the vehicle industry, a vehicle has more functions. For example, an in-vehicle audio system may implement functions such as active noise reduction and an emergency call. To implement these functions, the audio system may include the following devices an audio processing (e.g., digital signal processing (DSP)) device, a speaker, a microphone, a power amplifier configured to drive a high-power speaker, an audio signal source, and a data communication system that connects these functional entities. The audio signal source may include a radio, a magnetic tape or compact disk (CD) player, an audio and video entertainment player, a telematics box (T-Box), and the like.

Figure 1:
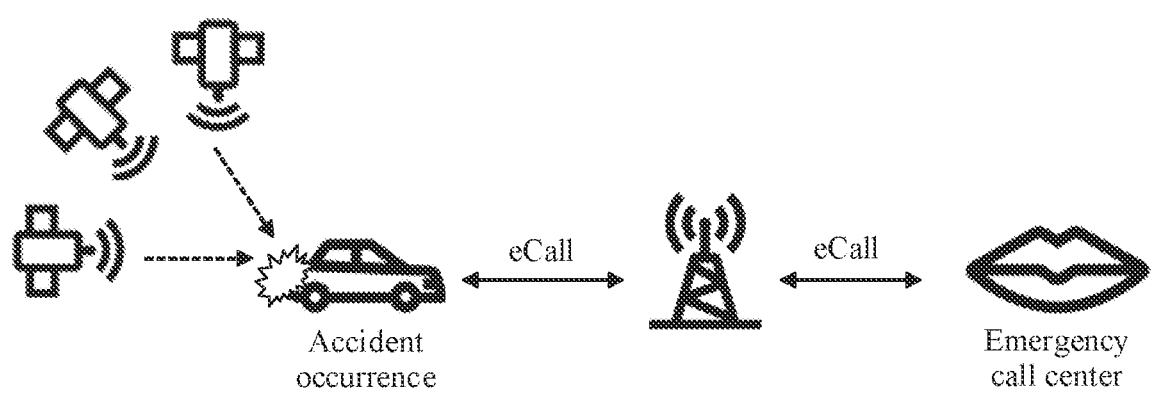
FIG. 1 is a schematic diagram of an emergency call scenario according to an embodiment of this application.

A T-Box in a vehicle is generally required to be capable of making an eCall in an emergency. In the emergency, the T-Box sends eCall information to an emergency call center. As shown in FIG. 1, when an accident occurs on the vehicle, an eCall initiates an emergency call (for example, 112), and quickly reports eCall data such as an accident status and location information of the vehicle to the emergency call center through a base station.

In a vehicle with limited deployment space, a daisy chain topology can reduce a length of a connected cable, simplify cabling, reduce a quantity of audio DSPs, and improve flexibility of device deployment. Therefore, the daisy chain topology is usually used for networking and transmission of the in-vehicle audio system.

Figure 2:
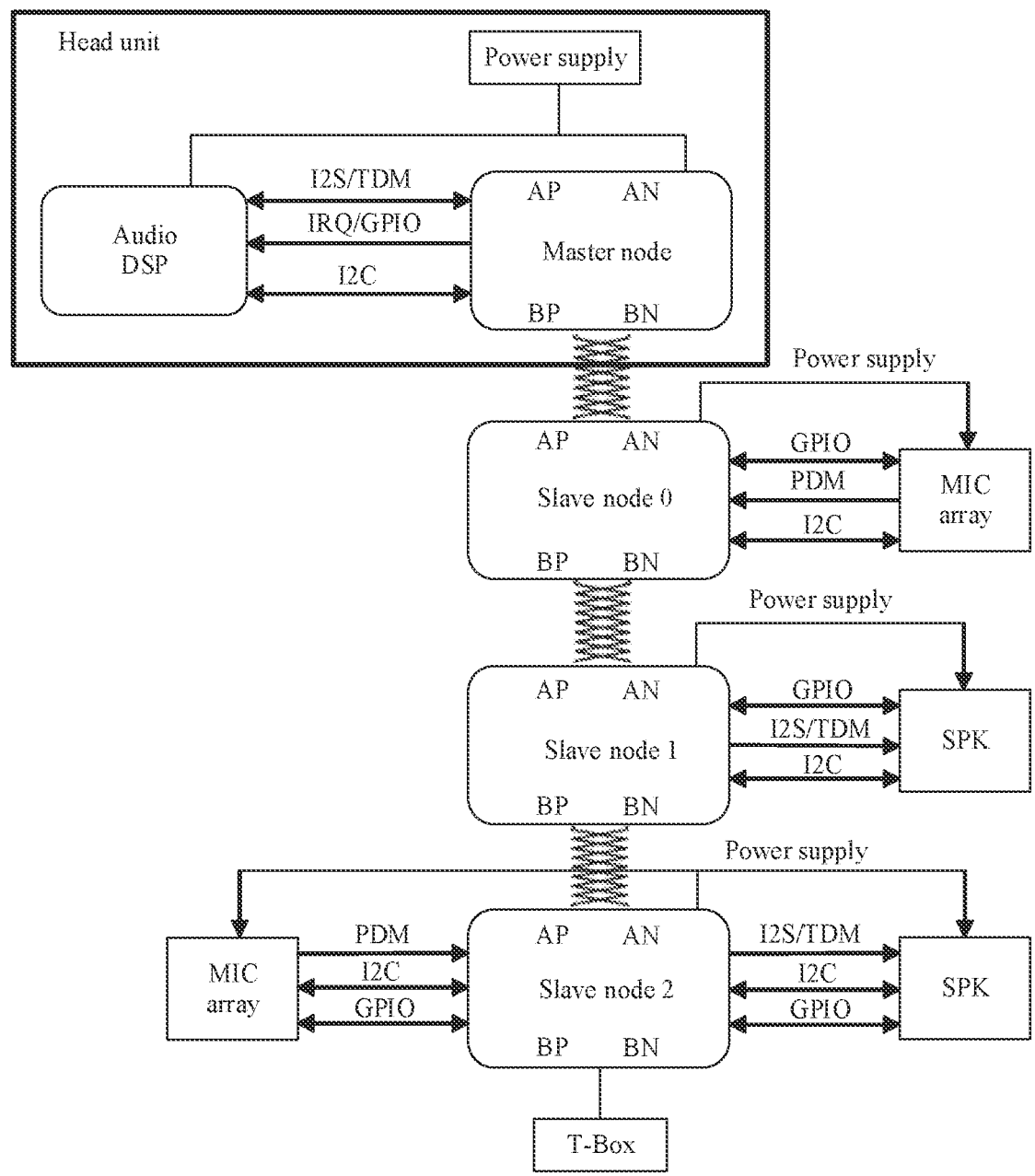
FIG. 2 is a schematic diagram of an emergency call system according to an embodiment of this application.

The data communication system of the in-vehicle audio system may include a host, a master node, and a slave node. The host may include an audio DSP. The master node is a main control node for digital communication control. One end of the master is connected to the host and the other end of the master is connected to the slave node. A plurality of slave nodes may be connected level by level to form a daisy chain. The master node and the slave node may externally connect to peripherals such as a microphone and a speaker. For example, the data communication system includes one host, one master node, and three slave nodes. The data communication system is shown in FIG. 2 (in the figure, the master node is a master node, a slave node 0 is a slave node 0, and other slave nodes are similar). The T-Box may be flexibly deployed at any location in the daisy chain. In other words, the T-Box may be connected to any slave node in the data communication system. The host may be configured to process data transmitted by an external device such as the microphone. For example, the host performs processing such as filtering and noise reduction on voice data collected by the microphone. The master node is configured to encapsulate the data processed by the host and send encapsulated data to each slave node, and may also receive data sent by each slave node, and decapsulate the data and send decapsulated data to the host. The slave node is configured to send data collected by the external device to the master node, or may receive data sent by the master node. During the emergency call, the T-Box may collect, by using the data communication system, in-vehicle voice collected by the MIC or a MIC array, location information, and information about various sensors (such as an airbag), and transmit the information back to the emergency call center by using an eCall function. Downlink data streams such as an audio are sent from the host to the master node and then transmitted to speakers connected to the slave nodes. A transmission path may be described as the host→the master node→the slave node 0→slave node 1→slave node 2. Uplink data streams such as an audio are collected by the microphone and transmitted to the slave node. The slave node sends the data streams to the master node, and then the master node forwards the data streams to the audio DSP. A transmission path may be described as the slave node 2→the slave node 1→the slave node 0→the master node→the audio DSP.

The daisy chain topology is a cascading topology. A fault on an upper-level link affects normal working of a lower-level link and below. For example, in FIG. 2, if a fault occurs on the slave node 1 or a fault occurs on a line connecting the slave node 1 and the slave node 2, the slave node 2 cannot work normally, and the T-Box cannot complete the emergency call.

Based on this, embodiments of this application provide an emergency call method and apparatus, to resolve a problem that a telematics box cannot complete an emergency call when an upper-level link or node of a slave node connected to the telematics box is faulty. The method and the apparatus are conceived based on a same technical concept. The method and the device have similar principles for resolving problems. Therefore, for implementation of the apparatus and the method, refer to each other. Details are not repeatedly described. The emergency call method and apparatus provided in the embodiments of this application may be applied to an in-vehicle computing function, an in-vehicle communication function, and systems corresponding to the functions, especially an in-vehicle computing function, an in-vehicle communication function, and systems corresponding to the functions that are in an autonomous vehicle.

To facilitate understanding of the embodiments of this application, the following describes terms related to the embodiments of this application.

A T-Box is also referred to as a telematics box, or may be referred to as a vehicle-mounted T-Box. A vehicle communicates with the outside by using the T-Box. For example, the vehicle communicates with a base station by using the T-Box, the vehicle communicates with a roadside station by using the T-Box, and different vehicles communicate with each other by using their own T-Boxes. A T-Box in an intelligent vehicle may report information such as a driving status of the vehicle to a network, or may control the vehicle through the network. The T-Box generally has a global positioning function, such as BEIDOU, a Global Positioning System (GPS), or Galileo, to provide location information of the vehicle. The T-Box may include a communications module, to complete the foregoing communication function. The T-Box in the intelligent vehicle may further be connected, through an in-vehicle network, to controllers such as a controller of in-vehicle entertainment (which may also be referred to as a head unit) and a controller of autonomous driving in the vehicle, to implement functions such as data reporting, remote control, and over the air (OTA). For ease of description, the telematics box is collectively referred to as a T-Box below.

eCall: The eCall can provide quick assistance for a driver who encounters a collision. An eCall device may be deployed in a vehicle. When a serious traffic accident occurs, the device automatically dials an emergency number (for example, 112), and sends information about airbag unfolding and a sensor impact caused by the collision, and coordinates of the vehicle in the GPS or the Galileo positioning system to a local emergency agency through wireless communication.

Host: A host in a data communication system may control a transmission node, a peripheral, and the like in the data communication system. For example, the host may allocate a transmission resource to the transmission node in the data communication system. For example, the host may allocate a transmission timeslot to each transmission node. For another example, the host may also perform read/write control on the transmission node in the data communication system. For another example, the host may further control the peripheral connected to the data communication system, for example, control volume and playing or pausing of an output device such as a power amplifier or a speaker, and a working mode of an input device such as a microphone. For another example, the host may further perform fault detection and control on a device in the data communication system, for example, detect whether the device is faulty, or control the device to disconnect from a link. In addition, the host may further implement other control functions, which are not listed one by one herein.

Master node: A master node in a vehicle-mounted communications system may be a transmission node working in a master node mode. The master node may receive data, control information, and the like that are sent by a host, encapsulate the data, the control information, and the like that are sent by the host, and send encapsulated data, control information, and the like to each slave node. The master node may further receive data sent by each slave node, decapsulate the data sent by each slave node, and send decapsulated data to the host. If the master node is connected to a peripheral, the master node may also perform data transmission with the peripheral, for example, obtain data collected by the peripheral, and send data or control information to the peripheral. The master node may further encapsulate the data collected by the peripheral connected to the master node, and send encapsulated data to the host, or may further decapsulate the data, the control information, and the like that are sent by the host, and send decapsulated data, control information, and the like to the connected peripheral. In addition, the master node may further implement other control functions, which are not listed one by one herein.

Slave node: A slave node in a vehicle-mounted communications system may be a transmission node working in a slave node mode. The slave node may obtain data collected by a peripheral and send the data to a master node, and may further send data sent by the master node to the connected peripheral, or control the peripheral based on control information sent by the master node, for example, control the peripheral to read and write, collect data, and disable/work. If the slave node is an intermediate node in a daisy chain, the slave node may further forward data sent by a lower-level slave node to the master node, or forward data, control information, and the like that are sent by the master node to the lower-level slave node. In addition, the slave node may further implement other control functions, which are not listed one by one herein.

An upper-level transmission node of a transmission node may be understood as another transmission node located behind the transmission node in uplink data transmission, or may be understood as a transmission node between the transmission node and a host. For example, an upper-level transmission node of the slave node 2 in FIG. 2 may be the slave node 1, the slave node 0, or the master node.

A lower-level transmission node of a transmission node may be understood as another transmission node located behind the transmission node in downlink data transmission. For example, an upper-level transmission node of the slave node 0 in FIG. 2 may be the slave node 1 or the slave node 2.

Peripheral: The peripheral may include a sensor such as a microphone, a millimeter-wave radar, a laser radar, an ultrasonic radar, a camera, a positioning system such as a GPS, an inertial sensor such as an inertial measurement unit (IMU), a speed sensor, an acceleration sensor, a humidity sensor, and a light intensity sensor that are used on a vehicle. The peripheral may further include a playback device, such as a display screen, an external power amplifier, and a speaker. The peripheral may further include other devices, which are not listed one by one herein.

It should be understood that network elements such as the host, the master node, and the slave node in the embodiments of this application are logical concepts. In practice, a form of the network element may be a physical device, a box, a board, or a function implemented by a chip or an area on the board. In practice, a plurality of network elements may alternatively be integrated into one device. For example, the slave node 1 and the slave node 2 may be on one circuit board.

Figure 3:
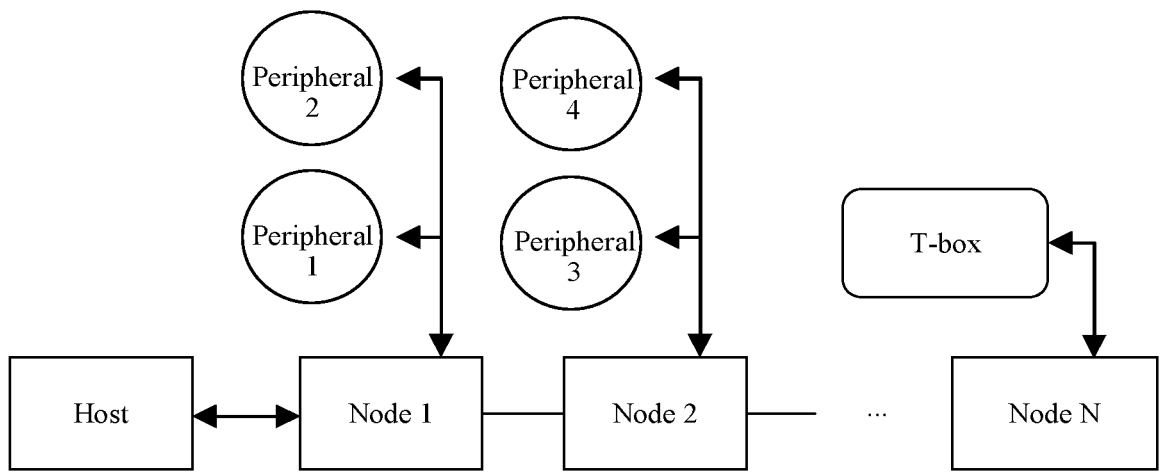
FIG. 3 is a schematic diagram of an emergency call system according to an embodiment of this application.

An embodiment of this application provides a vehicle-mounted communications system. The system may include a T-Box, a host, a plurality of transmission nodes, and a peripheral connected to the transmission node. A transmission node connected to the host may be in a master node mode. In other words, the host is connected to a master node. Another transmission node may be in a slave node mode. In other words, the other transmission node is a slave node. The T-Box may be connected to any transmission node. For example, FIG. 3 is a schematic diagram of the communications system. The system includes one host (shown as a host in the figure), and a plurality of transmission nodes, namely, a node 1 to a node N. The node 1 to the node N may be connected level by level. The node 1 is the master node, and is connected to a peripheral 1 and a peripheral 2. The node 2 to the node N are slave nodes. The node 2 is connected to a peripheral 3 and a peripheral 4. The node N is connected to the T-Box. It may be understood that FIG. 3 is merely an example for description, and does not further limit a quantity of hosts, a quantity of transmission nodes, a connection relationship between the host and the transmission node, a connection relationship between the transmission nodes, a connection relationship between the transmission node and the peripheral, a deployment location of the T-Box, and the like in the vehicle-mounted communications system.

The host may be connected to the master node through, but not limited to, an Inter-Integrated Circuit (I2C)/integrated audio interface (I2S)/time-division multiplexing (TDM)/pulse code modulation (PCM)/pulse density modulation (PDM)/general-purpose input/output (GPIO) interface. The master node may be connected to a power supply, and the power supply supplies power to the master node. The master node may supply power to the slave node, and each transmission node may further supply power to a connected peripheral and the T-Box. The master node may be connected to the power supply through an AP/AN interface or another interface. An upper-level transmission node may be connected to an AP/AN interface of a lower-level transmission node through a BP/BN interface, to implement electrical transmission and signal transmission between the upper-level transmission node and the lower-level transmission node. The transmission node may be connected to the peripheral through the I2C/I2S/TDM/PCM/PDM/GPIO interface. For example, the transmission node may be connected to a MIC array through the PDM interface, and the transmission node may be connected to an SPK through the I2S/TDM interface. For example, the vehicle-mounted communications system may be shown in FIG. 2.

It should be understood that, in this embodiment of this application, a twisted pair (TP) connection is merely used as an example to describe a connection manner between devices. In a specific implementation, two devices may alternatively be connected in another manner, for example, in a coaxial manner. The connection manner between the devices is not further limited in this embodiment of this application.

It should be understood that, in this embodiment of this application, an in-vehicle eCall function is merely used as an example for description, but this embodiment of this application is not limited to the in-vehicle eCall function, and may also be applied to various communication scenarios, to ensure redundancy of a device or a function component in a system.

It should be understood that, in the embodiments of this application, "at least one" means one or more, and "a plurality of" means two or more. The term "and/or" describes an association relationship between associated objects and represents that three relationships may exist. For example, A and/or B may represent the following cases: only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

It should be understood that, in descriptions of this application, words such as "first" and "second" are merely used for distinction and description, and shall not be understood as an indication or implication of relative importance or an indication or implication of an order.

The following describes in detail the embodiments of this application with reference to accompanying drawings.

Embodiment 1

Figure 4:
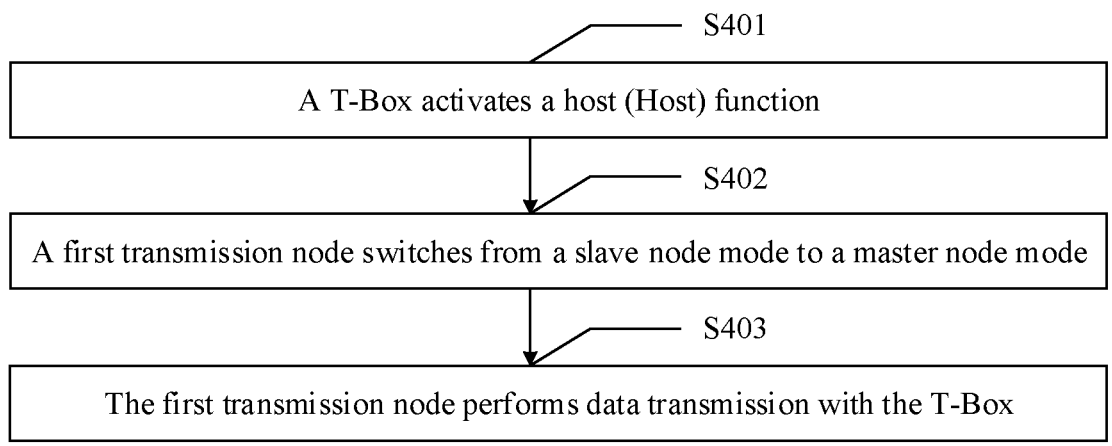
FIG. 4 is a schematic diagram of an emergency call method according to an embodiment of this application.

This application provides an emergency call method. The method may be applied to a vehicle-mounted communications system. The vehicle-mounted communications system includes a T-Box and a data communication system. The data communication system includes a first transmission node, and the T-Box is connected to the first transmission node. As shown in FIG. 4, the method includes the following steps.

S401: The T-Box activates a host function.

The host function may also be understood as a function of a host in the data communication system. For example, the host function may include a function of controlling the first transmission node and a peripheral connected to the first transmission node, for example, controlling the first transmission node to read/write, or controlling the first transmission node to report data collected by the peripheral. If the first transmission node is connected to a lower-level transmission node, the host function may further include a function of controlling the lower-level transmission node of the first transmission node and a peripheral connected to the lower-level transmission node of the first transmission node, for example, controlling the lower-level transmission node of the first transmission node to read/write, or controlling the lower-level transmission node of the first transmission node to report data collected by the peripheral. The host function may further include a function of allocating a transmission resource to the lower-level transmission node of the first transmission node, and the like. The host function may further process data transmitted by the first transmission node, for example, perform processing such as noise reduction on audio data. It may be understood that the data transmitted by the first transmission node may include data obtained by the first transmission node from the peripheral connected to the first transmission node, and further include data sent by the lower-level transmission node to the first transmission node. In addition, the host function may include other functions, which are not listed one by one herein.

In an example, the host function may be a functional module in the T-Box, or a functional module externally connected to the T-Box. If the host function is the functional module externally connected to the T-Box, the host function may alternatively be triggered by the first transmission node for activation.

In some embodiments, when the data communication system works normally, the T-Box may be triggered, by a signal for triggering an emergency call, to activate the host function.

In an implementation, the T-Box may activate the host function when detecting the signal for triggering the emergency call.

In another implementation, when detecting the signal for triggering the emergency call, the first transmission node may send, to the T-Box, an instruction used to instruct the T-Box to activate the host function. The T-Box activates the host function after receiving the instruction.

Further, in the foregoing two implementations, the first transmission node may disconnect a connection to an upper-level transmission node. It may be understood that the connection herein may refer to a power supply connection and a signal connection. FIG. 2 is used as an example. The first transmission node is the slave node 2. When detecting the signal for triggering the emergency call, the T-Box may activate the host function. The slave node 2 disconnects a connection to the slave node 1. For example, the slave node 2 may only disconnect a signal connection to the slave node 1. Alternatively, the slave node 2 may disconnect a signal connection and a power supply connection to the slave node 1.

In some other embodiments, the T-Box may be triggered by a fault of the data communication system to activate the host function.

In an implementation, the data communication system may further include a master node. The T-Box may alternatively activate the host function when detecting that a connection between the first transmission node and the master node is interrupted.

For example, when detecting that power supply is interrupted, the T-Box may determine that the connection between the first transmission node and the master node is interrupted. When detecting that a signal between the T-Box and the first transmission node is interrupted, the T-Box may determine that the connection between the first transmission node and the master node is interrupted.

In another implementation, when detecting that the connection between the first transmission node and the master node is interrupted, the first transmission node may send, to the T-Box, the instruction used to instruct the T-Box to activate the host function. The T-Box activates the host function after receiving the instruction.

For example, when detecting that power supply is interrupted, the first transmission node may determine that the connection between the first transmission node and the master node is interrupted. When detecting that a signal between the first transmission node and an adjacent upper-level transmission node is interrupted, the first transmission node may determine that the connection between the first transmission node and the master node is interrupted.

Interruption of the connection between the first transmission node and the master node may be caused by a fault of the upper-level transmission node of the first transmission node. FIG. 2 is used as an example. A fault of the slave node 1 may cause interruption of a connection between the slave node 2 and the master node. The interruption of the connection between the first transmission node and the master node may alternatively be caused by interruption of the connection between the first transmission node and the upper-level transmission node. FIG. 2 is used as an example. Interruption of a link between the slave node 1 and the slave node 2 may cause interruption of a connection between the slave node 2 and the master node. The interruption of the connection between the first transmission node and the master node may alternatively be caused by interruption of a connection between two upper-level transmission nodes of the first transmission node. FIG. 2 is used as an example. Interruption of a link between the slave node 1 and the slave node 0 may cause interruption of a connection between the slave node 2 and the master node.

In an implementation, the host function of the T-Box may be disabled before activation is triggered. For example, in an embodiment in which activation of the host function is triggered by the signal for triggering the emergency call, the host function may be disabled before the emergency call. For another example, in an embodiment in which activation of the host function is triggered by the fault of the data communication system, the host function may be disabled before the data communication system is faulty.

S402: The first transmission node switches from a slave node mode to a master node mode.

It may be understood that after the first transmission node switches from the slave node mode to the master node mode, the first transmission node may implement a function of the master node.

In an implementation, the first transmission node may switch from the slave node mode to the master node mode when detecting the signal for triggering the emergency call.

In another implementation, when detecting the signal for triggering the emergency call, the T-Box may send, to the first transmission node, an instruction used to instruct the first transmission node to switch from the slave node mode to the master node mode. The first transmission node switches from the slave node mode to the master node mode after receiving the instruction.

In still another implementation, alternatively, when detecting that the connection between the first transmission node and the master node is interrupted, the T-Box may send, to the first transmission node, the instruction used to instruct the first transmission node to switch from the slave node mode to the master node mode. The first transmission node switches from the slave node mode to the master node mode after receiving the instruction.

In still another implementation, the first transmission node may switch from the slave node mode to the master node mode when detecting that the connection between the first transmission node and the master node is interrupted.

S403: The first transmission node performs data transmission with the T-Box.

Further, the first transmission node performs data transmission on emergency call-related data with the T-Box.

It should be noted that step S401 and step S402 are not subject to a sequence. Step S401 may be performed before step S402, or step S402 may be performed before step S401, or step S401 and step S402 may be simultaneously performed.

In some embodiments, before the T-Box performs data transmission with the first transmission node, the T-Box may be synchronized with the first transmission node. In an implementation, the T-Box may implement synchronization between the T-Box and the first transmission node by receiving an instruction that is sent by the first transmission node and that is used to implement synchronization between the T-Box and the first transmission node. In another implementation, the T-Box may alternatively implement synchronization between the T-Box and the first transmission node by sending, to the first transmission node, an instruction used to implement synchronization between the T-Box and the first transmission node.

For example, the instruction may be a handshake instruction. For example, after the T-Box sends the instruction to the first transmission node, the first transmission node responds to the T-Box. Alternatively, after the first transmission node sends the instruction to the T-Box, the T-Box responds to the first transmission node.

In a possible implementation, the data communication system may further include at least one second transmission node. The second transmission node is a lower-level transmission node of the first transmission node. After the T-Box activates the host function, the T-Box may allocate a transmission resource to the at least one second transmission node. The T-Box sends resource allocation information to the first transmission node. The resource allocation information is used to indicate the transmission resource separately corresponding to the at least one second transmission node. The first transmission node may separately send configuration information to the at least one second transmission node. The configuration information is used to indicate the transmission resource corresponding to the second transmission node.

In an example, before step S401, the T-Box may be powered by the first transmission node. After step S401, the T-Box may switch from being powered by the first transmission node to being powered by a local power supply.

Further, after being powered by the local power supply, the T-Box may further supply power to the first transmission node. In an implementation, the T-Box may supply power to the first transmission node through an original interface.

In addition, the first transmission node may supply power to the second transmission node. The first transmission node may further supply power to the peripheral connected to the first transmission node. Each second transmission node may further supply power to a peripheral connected to the second transmission node.

To better understand the solution provided in Embodiment 1 of this application, the following further describes an emergency call process with reference to the vehicle-mounted communications system shown in FIG. 2.

Figure 5A:
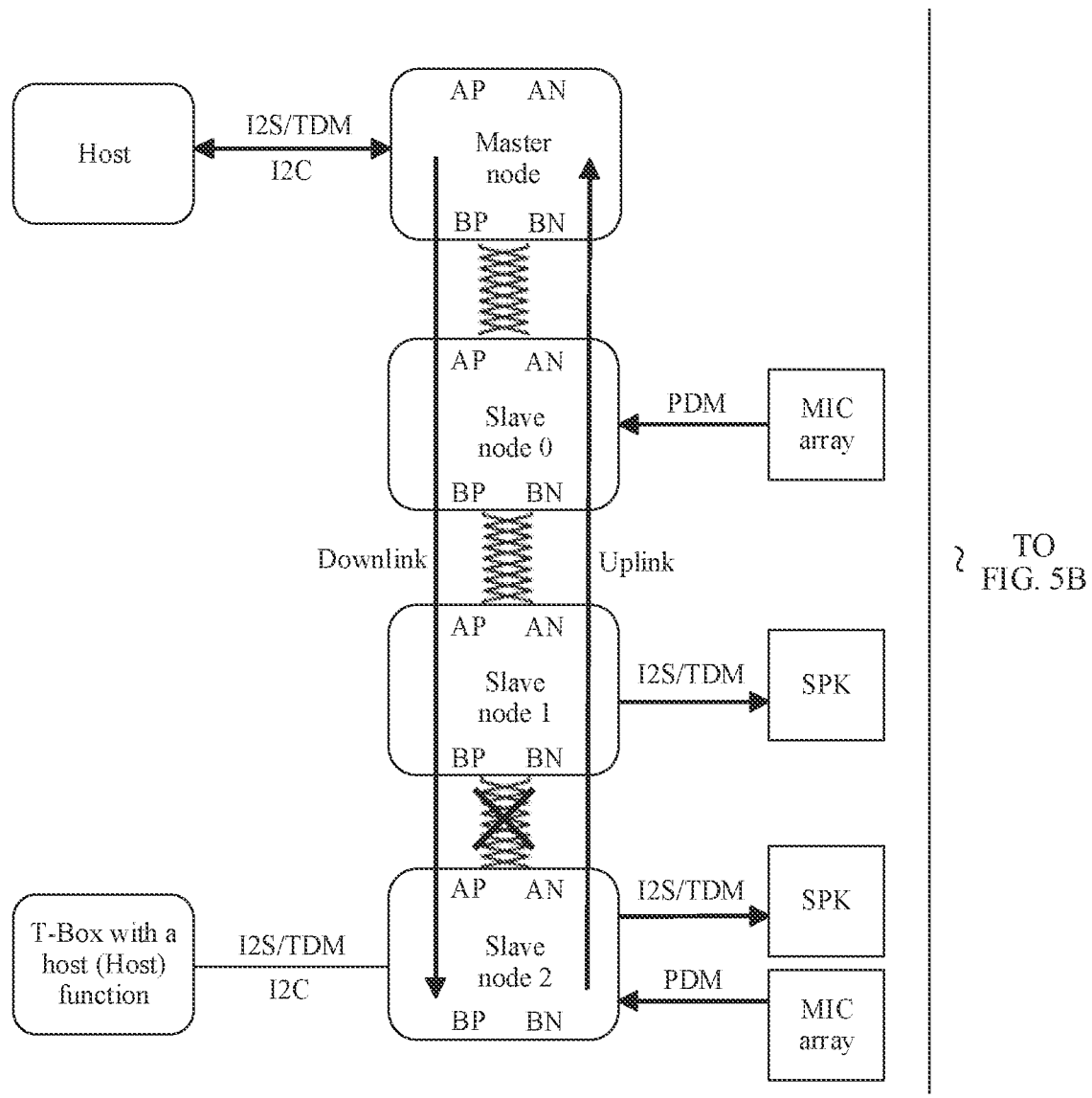
FIG. 5A and FIG. 5B are a schematic diagram of an emergency call system according to an embodiment of this application.
Figure 5B:
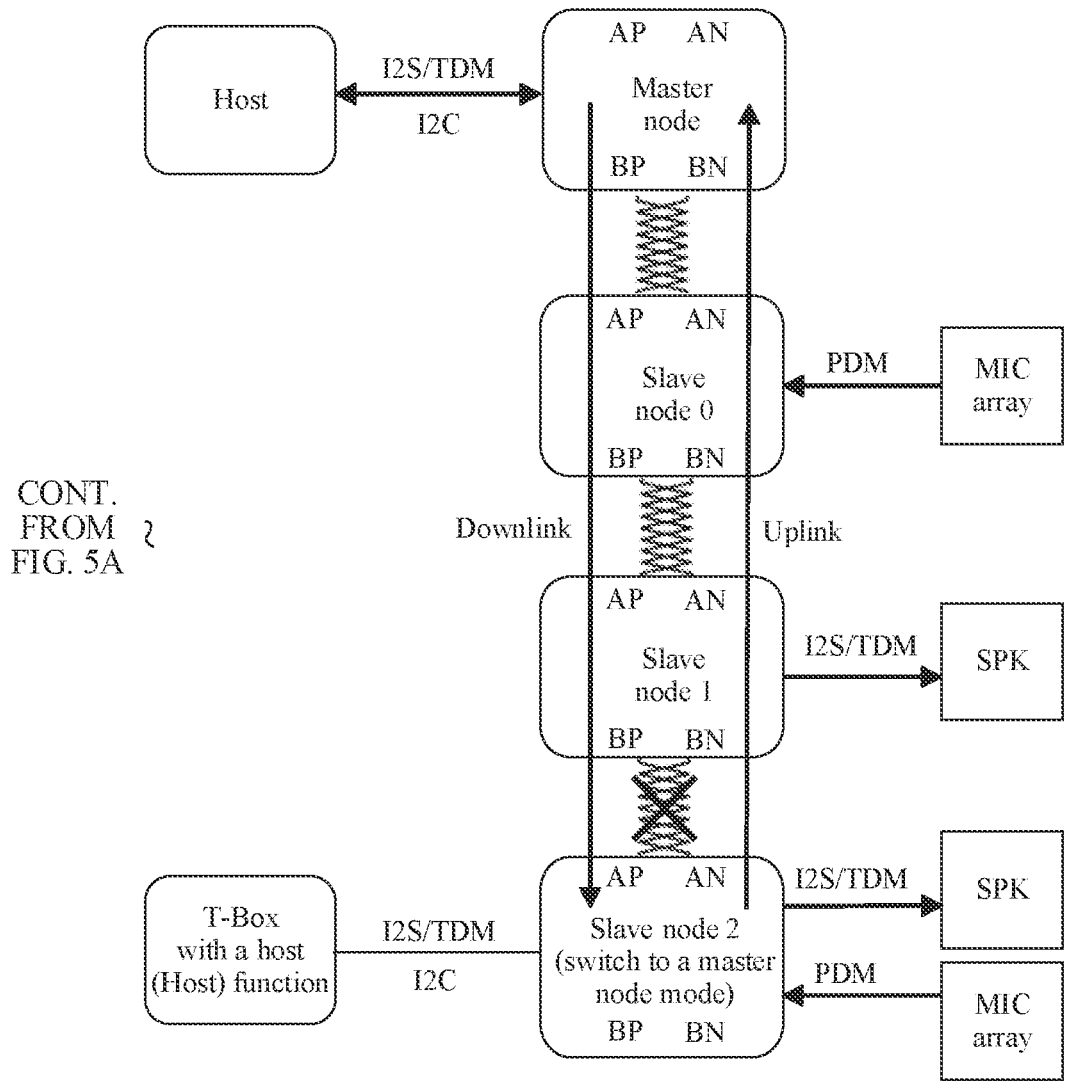

A possible emergency call process may include, as shown in FIG. 5A and FIG. 5B, the T-Box may obtain power from a daisy chain or be powered by the local power supply. When the data communication system works normally, the T-Box is powered by the daisy chain. When a link or a node in the data communication system is faulty, the T-Box detects the fault, and may switch to being powered by the local power supply to ensure normal working of the T-Box. The T-Box may supply power to the slave node 2 through the original interface, and control the slave node 2 to switch to a master node mode, so that the slave node 2 changes from being controlled by the master node in the data communication system to being controlled by the T-Box, to ensure that data collected by the peripheral can be transmitted to the T-Box, and data of the T-Box can also be transmitted to the peripheral. In an implementation, when the data communication system works normally, the host function of the T-Box may be in a disabled state, and an eCall function may be in a running state. Therefore, if the data communication system works normally, the T-Box may obtain, by using the data communication system, the data collected by the peripheral when making the emergency call.

In Embodiment 1 of this application, the T-Box can be powered by the local power supply, the host function is deployed on the T-Box, and the first transmission node switches from the slave node mode to the master node mode, to provide redundancy for normal working of the eCall, and improve reliability of the eCall. When a link or node is faulty, the T-Box may supply power to the first transmission node, so that the first transmission node and the peripheral connected to the first transmission node can work normally. In addition, a working mode of the first transmission node is switched to the master node mode, so that the host function of the T-Box may receive, through the first transmission node, the data collected by the peripheral, and transmit the data back to an emergency call center. In this way, the eCall can work normally, and reliability of the eCall can be improved.

Embodiment 2

Figure 6:
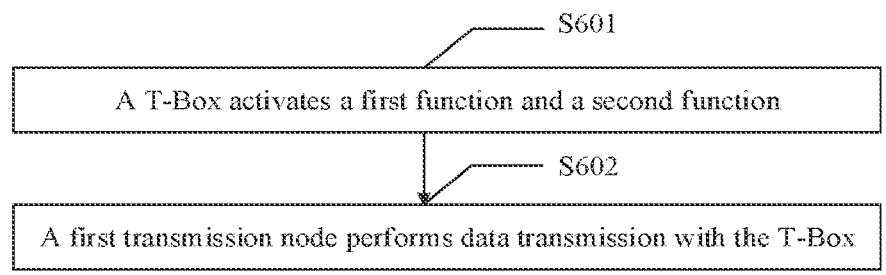
FIG. 6 is a schematic diagram of an emergency call method according to an embodiment of this application.

This application provides another emergency call method. The method may be applied to a vehicle-mounted communications system. The system may include a T-Box and a first transmission node. The T-Box is connected to the first transmission node. As shown in FIG. 6, the method includes the following steps.

S601: The T-Box activates a first function and a second function.

The first function is similar to the host function in Embodiment 1. For details, refer to related descriptions of the host function in Embodiment 1. Details are not repeatedly described.

The second function may be understood as a function of a master node in a data communication system. For example, the function of the master node may include receiving data, control information, and the like that are obtained after processing by the first function, encapsulating the data, the control information, and the like that are obtained after processing by the first function, and transmitting encapsulated data, control information, and the like to the first transmission node. Alternatively, the function of the master node may include receiving data sent by the first transmission node, and decapsulating the data sent by the first transmission node and transmitting decapsulated data to the first function for processing. It may be understood that the data sent by the first transmission node may include data obtained by the first transmission node from a peripheral connected to the first transmission node, and further include data sent by a lower-level transmission node to the first transmission node. In addition, the second function may include other functions, which are not listed one by one herein.

In an example, the first function and the second function may be functional modules in the T-Box, or functional modules externally connected to the T-Box. If the first function and the second function are functional modules externally connected to the T-Box, the first function and the second function may alternatively be triggered by the first transmission node for activation.

A process in which the T-Box activates the first function and the second function is similar to the process in which the T-Box activates the host function in Embodiment 1. A difference lies in that in Embodiment 1, the T-Box activates the host function, but in Embodiment 2, the T-Box activates the first function and the second function. Therefore, for a specific process in which the T-Box activates the first function and the second function, refer to related descriptions in Embodiment 1. Details are not repeatedly described.

In an implementation, the first function and the second function of the T-Box may be disabled before activation is triggered. For example, in an embodiment in which activation of the first function and the second function is triggered by a signal for triggering an emergency call, the first and the second function of the T-Box may be disabled before the emergency call. For another example, in an embodiment in which activation of the first function and the second function is triggered by a fault of the data communication system, the first function and the second function may be disabled before the data communication system is faulty.

S602: The first transmission node performs data transmission with the T-Box.

Further, the first transmission node performs data transmission on emergency call-related data with the T-Box.

In a possible implementation, the first transmission node may be connected to at least one lower-level transmission node. After the T-Box activates the first function and the second function, the T-Box may allocate transmission resources to the first transmission node and the at least one lower-level transmission node, and separately send configuration information to the first transmission node and the at least one lower-level transmission node. The configuration information is used to indicate the transmission resource corresponding to the transmission node.

In an example, before step S401, the T-Box may be powered by the first transmission node. After step S401, the T-Box may switch from being powered by the first transmission node to being powered by a local power supply. Alternatively, after step S401, the T-Box may not switch a power supply, and still be powered by the first transmission node. This may alternatively be understood as that the T-Box is still powered by a daisy chain of the data communication system.

Further, after being powered by the local power supply, the T-Box may further supply power to the first transmission node. In an implementation, the T-Box may supply power to the first transmission node through an original interface.

In addition, if the first transmission node has a lower-level transmission node, the first transmission node may supply power to the lower-level transmission node. The first transmission node may further supply power to the peripheral connected to the first transmission node. Each lower-level transmission node may further supply power to a peripheral connected to the lower-level transmission node.

To better understand the solution provided in Embodiment 2 of this application, the following further describes an emergency call process with reference to the vehicle-mounted communications system shown in FIG. 2.

Figure 7A:
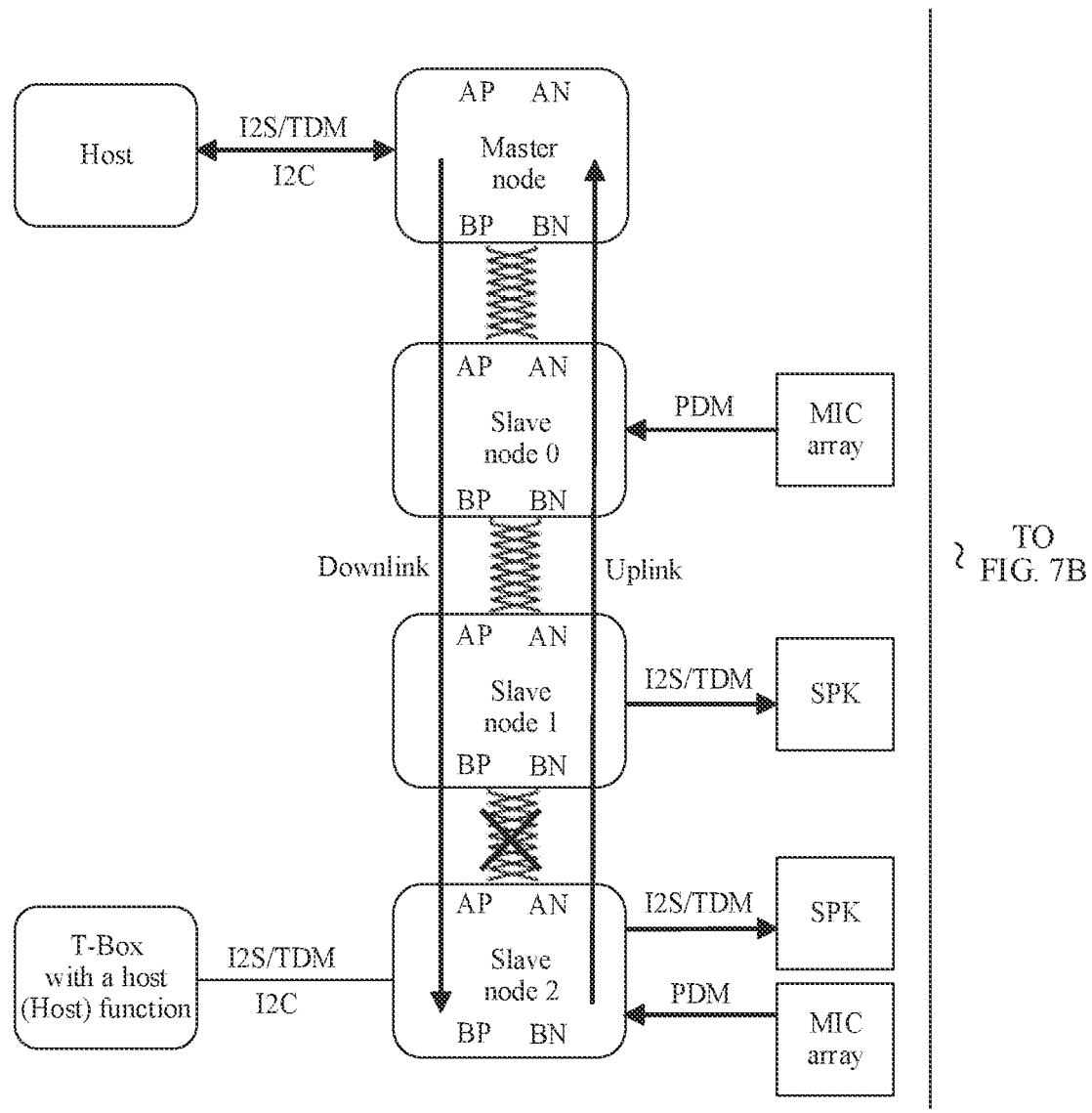
FIG. 7A and FIG. 7B are a schematic diagram of an emergency call system according to an embodiment of this application.
Figure 7B:
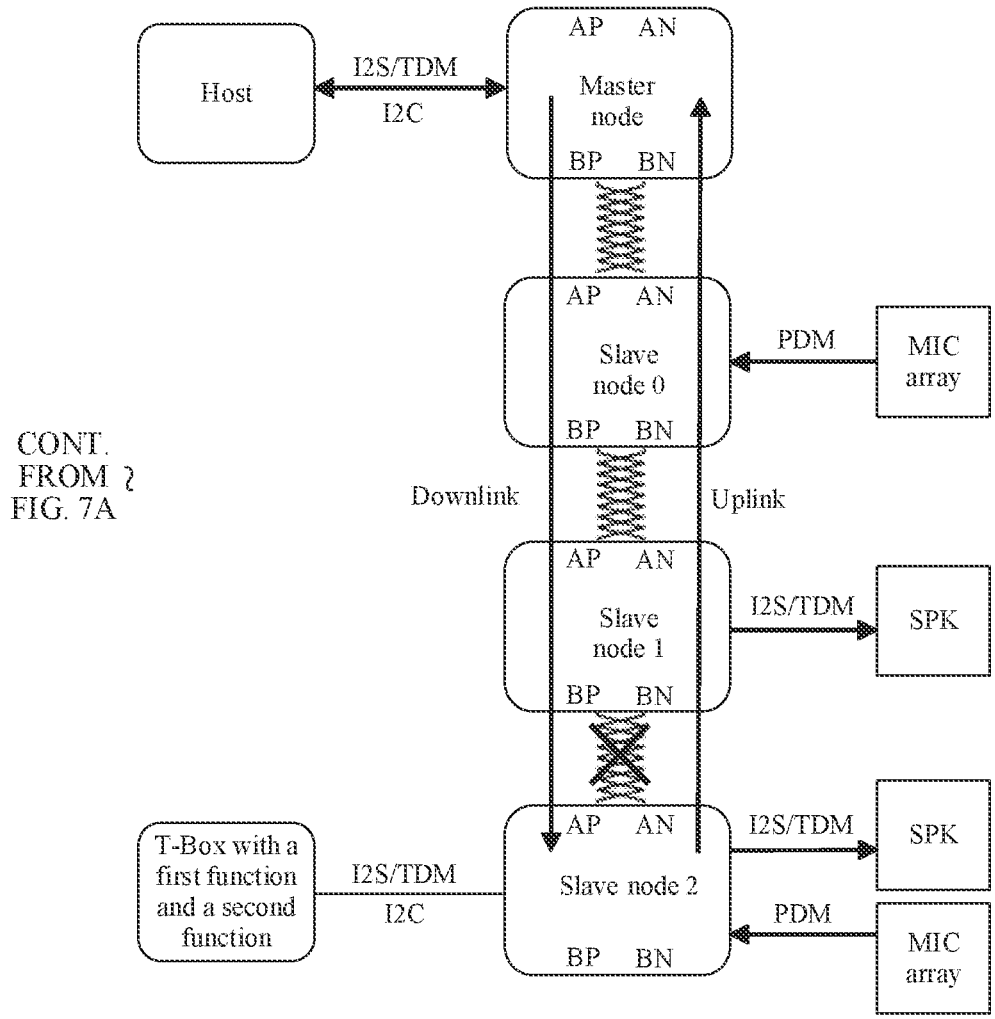

A possible emergency call process may include As shown in FIG. 7A and FIG. 7B, the T-Box includes the first function and the second function, and the T-Box may obtain power from the daisy chain or be powered by the local power supply. When the data communication system works normally, all nodes in the data communication system may be powered in a daisy chain manner, the first function and the second function of the T-Box may be in a disabled state, and an eCall function may be enabled. Therefore, when the emergency call is made, the T-Box may obtain, by using the data communication system, data collected by the peripheral. When a node or a link is faulty, the T-Box detects that the fault occurs, switches to being powered by the local power supply, and activates the first function and the second function. The slave node 2 is powered by the T-Box, and switches to a mode managed by the T-Box (further, managed by the second function of the T-Box). The slave node 2 changes from being controlled by the master node in the data communication system to being controlled by the T-Box, to ensure that the data collected by the peripheral can be transmitted to the T-Box, and data of the T-Box can also be transmitted to the peripheral.

In Embodiment 2 of this application, the T-Box can be powered by the local power supply, and the first function and the second function are deployed on the T-Box, to provide redundancy for normal working of an eCall, and improve reliability of the eCall. When the link or the node is faulty, the T-Box may supply power to the first transmission node, so that the first transmission node and the peripheral connected to the first transmission node can work normally. In addition, the T-Box may receive, by using the first function and the second function, the data collected by the peripheral, and transmit the data back to an emergency call center. In this way, the eCall can work normally, and reliability of the eCall is improved.

Embodiment 3

An embodiment of this application provides an emergency call system. The system may include a T-Box, a first system, a second system, and at least one peripheral. The first system includes at least one transmission node and a host. The second system includes at least one transmission node. Both the first system and the second system are connected to at least one peripheral, and the second system is connected to the T-Box through a first transmission node in the second system. The connection herein may be understood as a signal connection and a power supply connection. For ease of understanding, the following uses three transmission nodes included in the first system, one transmission node included in the second system, and three peripherals as an example. The emergency call system may be shown in FIG. 8. It should be understood that FIG. 8 is merely an example for description, and does not limit a quantity and a connection manner of transmission nodes in the first system, a quantity and a connection manner of transmission nodes in the second system, a quantity of peripherals, or the like.

Figure 9:
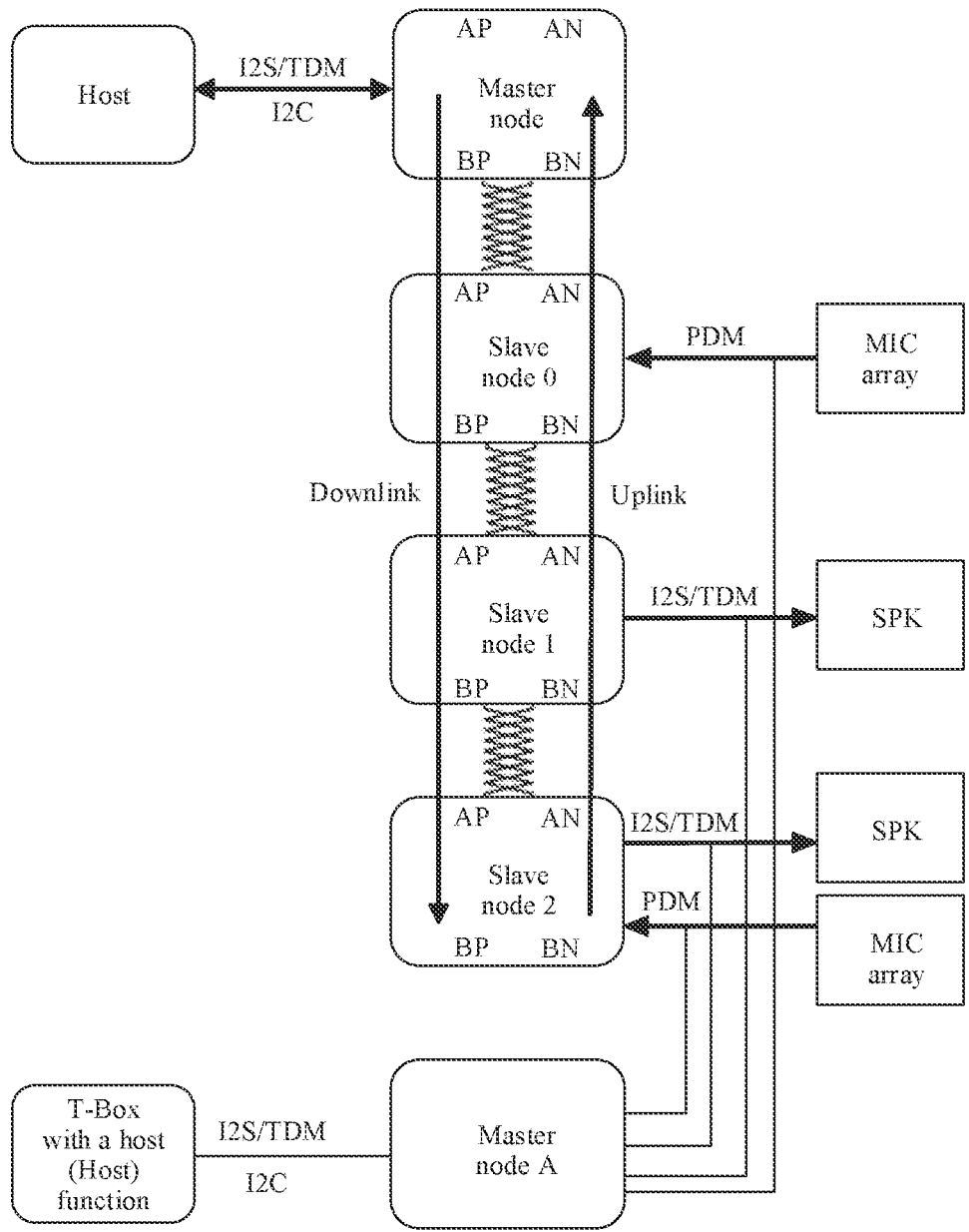
FIG. 9 is a schematic diagram of an emergency call system according to an embodiment of this application.

In an implementation, the T-Box may have a first function. The first transmission node may be in a master node mode. As shown in FIG. 9, the first function is similar to the host function in Embodiment 1. For details, refer to related descriptions of the host function in Embodiment 1. Details are not repeatedly described. In some embodiments, the T-Box may be connected to a second transmission node in the first system, as shown in FIG. 10.

Figure 8:
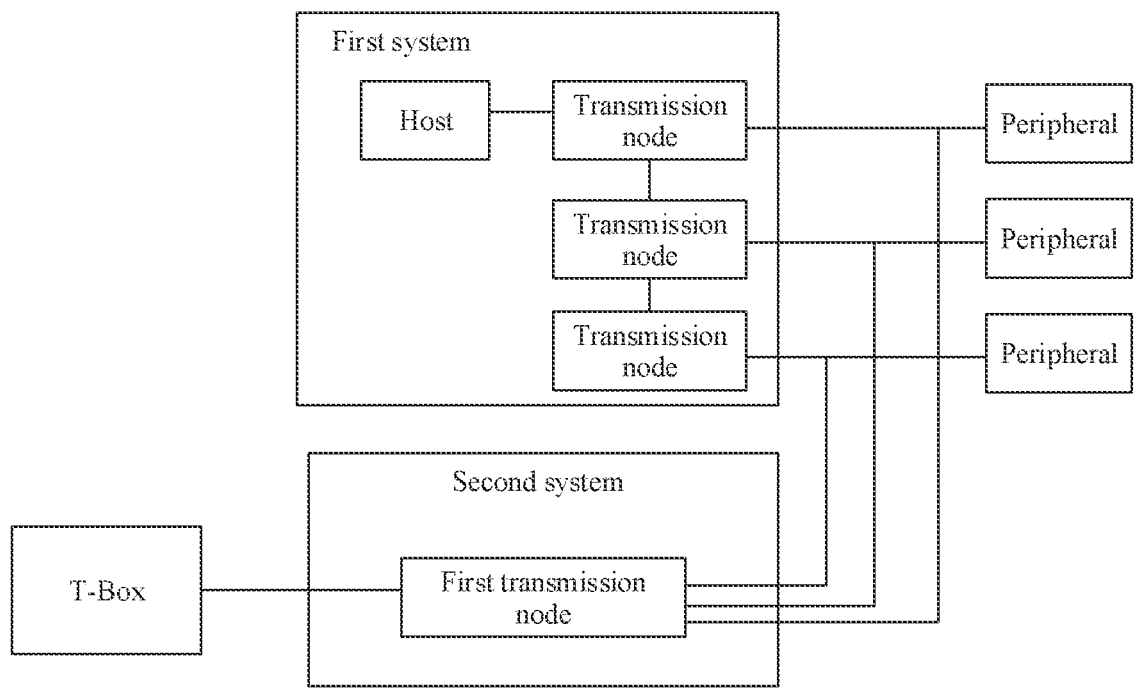
FIG. 8 is a schematic diagram of an emergency call system according to an embodiment of this application.
Figure 10:
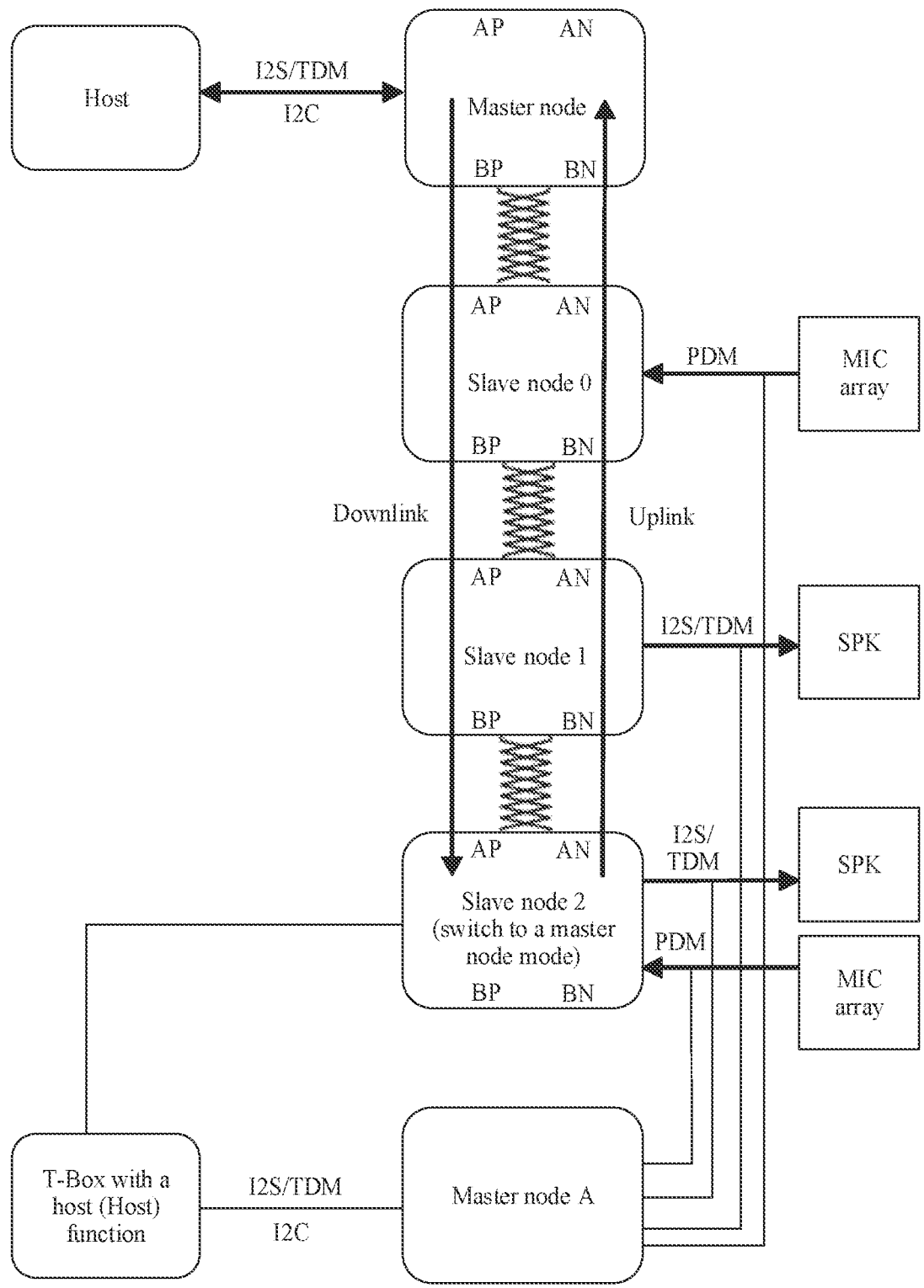
FIG. 10 is a schematic diagram of an emergency call system according to an embodiment of this application.

In the emergency call systems shown in FIG. 8 to FIG. 10, the T-Box may be powered by a local power supply, and may further supply power to the second system.

Figure 11:
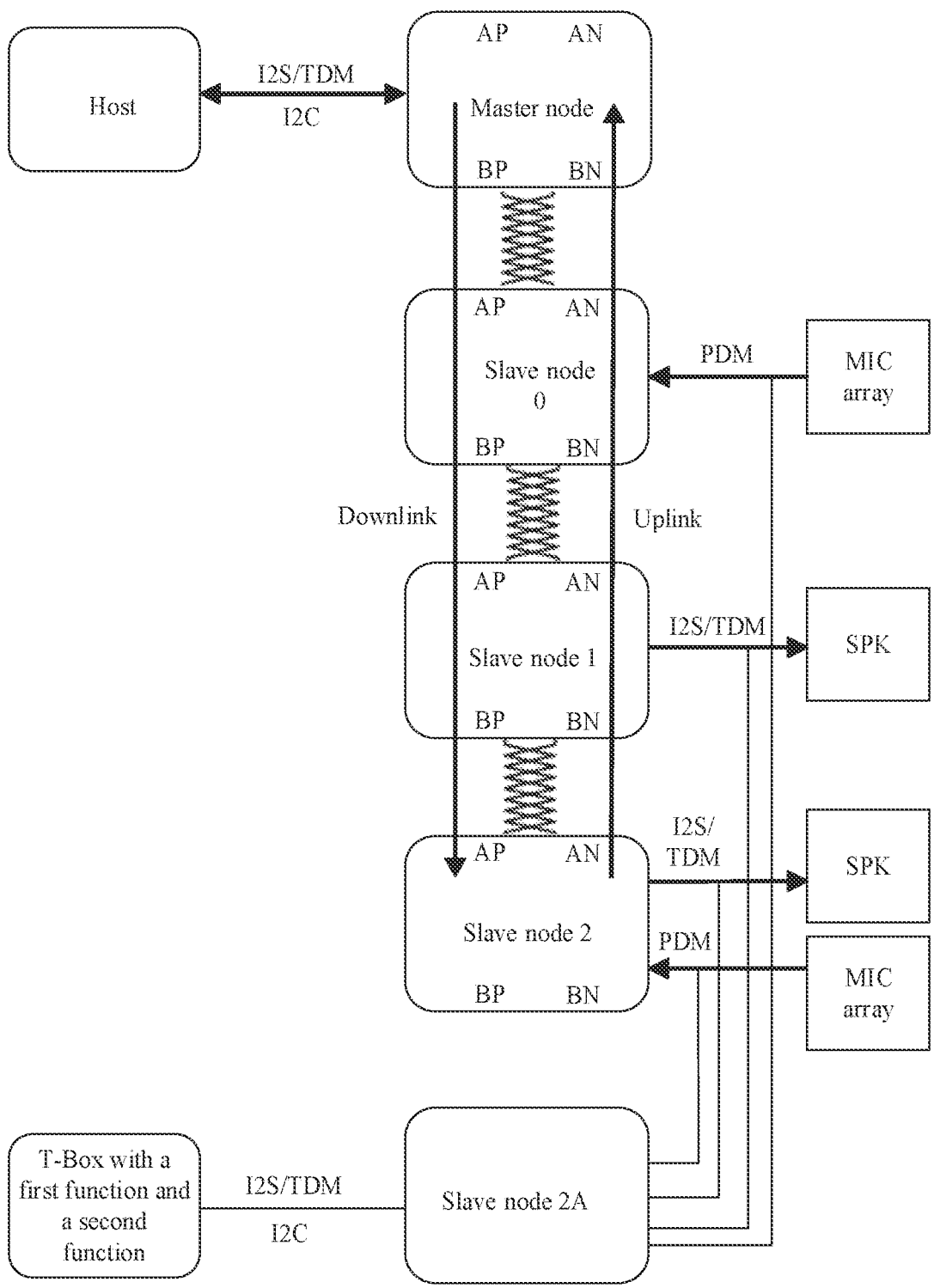
FIG. 11 is a schematic diagram of an emergency call system according to an embodiment of this application.

In another implementation, the T-Box may have the first function and a second function. Any transmission node in the second system may be in a slave node mode. As shown in FIG. 11, the first function and the second function are respectively similar to the first function and the second function in Embodiment 2. For details, refer to related descriptions of the first function and the second function in Embodiment 2. Details are not repeatedly described. In some embodiments, the T-Box may be connected to the second transmission node in the first system, as shown in FIG. 12.

Figure 12:
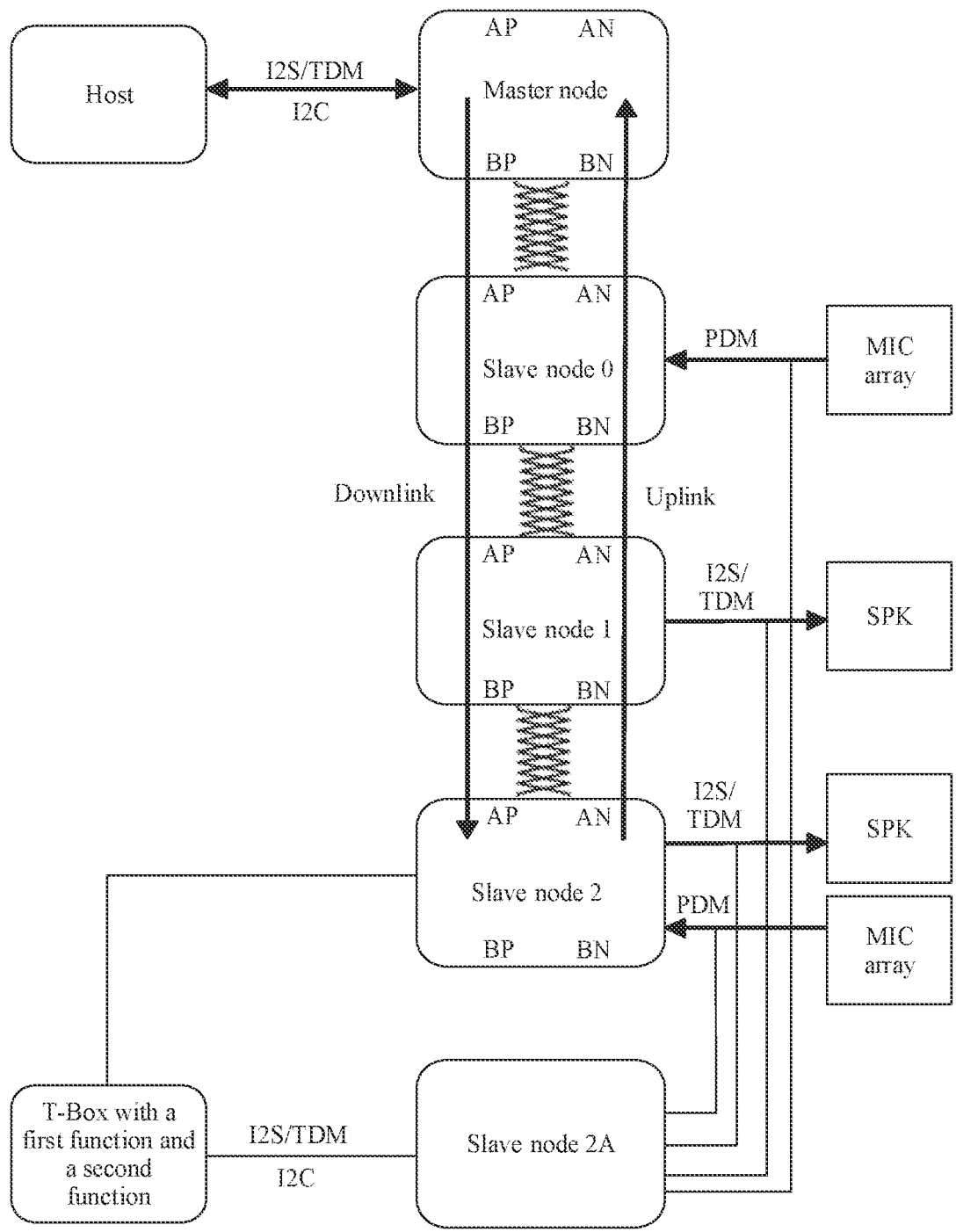
FIG. 12 is a schematic diagram of an emergency call system according to an embodiment of this application.

In the emergency call systems shown in FIG. 11 and FIG. 12 and in emergency call communication, when the T-Box performs data transmission with the first system, the T-Box may be powered by the local power supply, and may further supply power to the first system, and when the T-Box performs data transmission with the second system, the T-Box may be powered by the local power supply, and may further supply power to the second system.

Based on the emergency call system shown in FIG. 8, Embodiment 3 of this application further provides an emergency call method. The method includes that the T-Box determines to initiate an emergency call, and the T-Box performs data transmission with the first transmission node.

In some embodiments, the T-Box may determine to initiate the emergency call when detecting a signal for triggering the emergency call. Alternatively, the first transmission node may send signaling to the T-Box when detecting the signal for triggering the emergency call, and the T-Box initiates the emergency call after receiving the signaling.

Based on the emergency call system shown in FIG. 10, Embodiment 3 of this application further provides an emergency call method. The method includes, in emergency call communication, if the first system works normally, the T-Box performs data transmission with the second transmission node, and if the first system works abnormally, the T-Box performs data transmission with the first transmission node. Alternatively, in the emergency call communication, if the second system works normally, the T-Box performs data transmission with the first transmission node, and if the second system works abnormally, the T-Box performs data transmission with the second transmission node. For an implementation in which the T-Box performs data transmission with the second transmission node and an emergency call process, refer to Embodiment 1. Details are not described herein again.

Based on the emergency call system shown in FIG. 12, Embodiment 3 of this application further provides an emergency call method. The method includes, in emergency call communication, if the first system works normally, the T-Box performs data transmission with the second transmission node, and if the first system works abnormally, the T-Box performs data transmission with the first transmission node. Alternatively, in emergency call communication, if the second system works normally, the T-Box performs data transmission with the first transmission node, and if the second system works abnormally, the T-Box performs data transmission with the second transmission node. For an implementation in which the T-Box performs data transmission with the second transmission node and an emergency call process, refer to Embodiment 2. Details are not described herein again. For example, when the first system works, the second system may be disabled. When the second system works, the T-Box may disconnect a connection to the first system.

In Embodiment 3 of this application, the second system is added, the first system and the second system share the peripheral, and the T-Box performs data transmission on emergency call data through the second system. In normal working, the T-Box and the first system work independently. A fault of a node or a link in the first system does not affect the T-Box. The T-Box may obtain, through the second system, data collected by the peripheral, so that an eCall function can run normally, and reliability of the eCall can be improved.

In addition, the T-Box may further be connected to the first system, so that the T-Box is connected to two systems, and the two systems back up each other. When a link or a node of one system is faulty, the T-Box may obtain the data from the peripheral through the other system, to ensure normal running of the eCall function in the T-Box, and improve reliability of the eCall.

Embodiment 4

An embodiment of this application may further provide a networking method. In a data communication system, there is at least one transmission node and a plurality of transmission paths between the transmission node and a master node. In normal working, the transmission node may perform data transmission with the master node through one of the transmission paths, and another transmission path may be disabled. When the used transmission path is interrupted, data transmission may be performed with the master node through the other transmission path. The T-Box may be connected to any transmission node.

Figure 13:
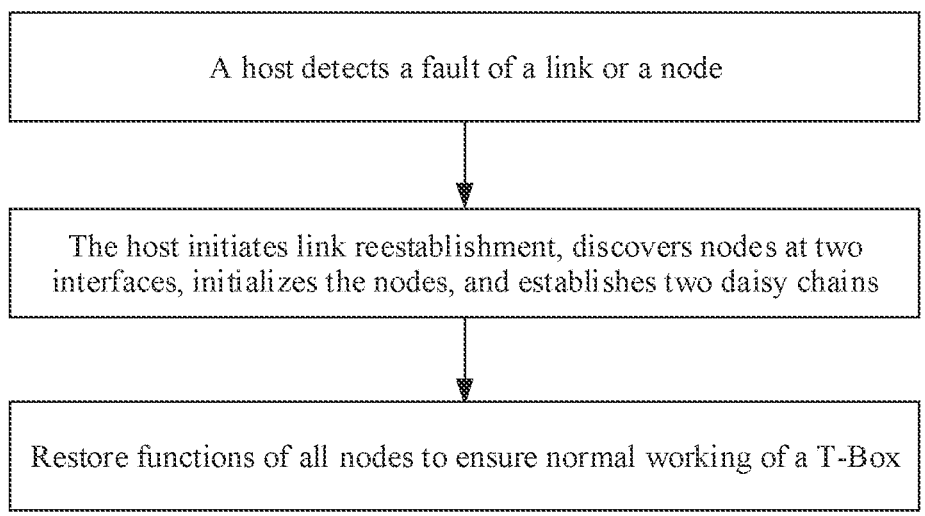
FIG. 13 is a schematic diagram of determining a transmission path according to an embodiment of this application.

When a node or a link is faulty, the host may detect a location of the fault, re-discover nodes at two interfaces, initialize the nodes, and establish two daisy chains to restore an entire network, as shown in FIG. 13.

Figure 14:
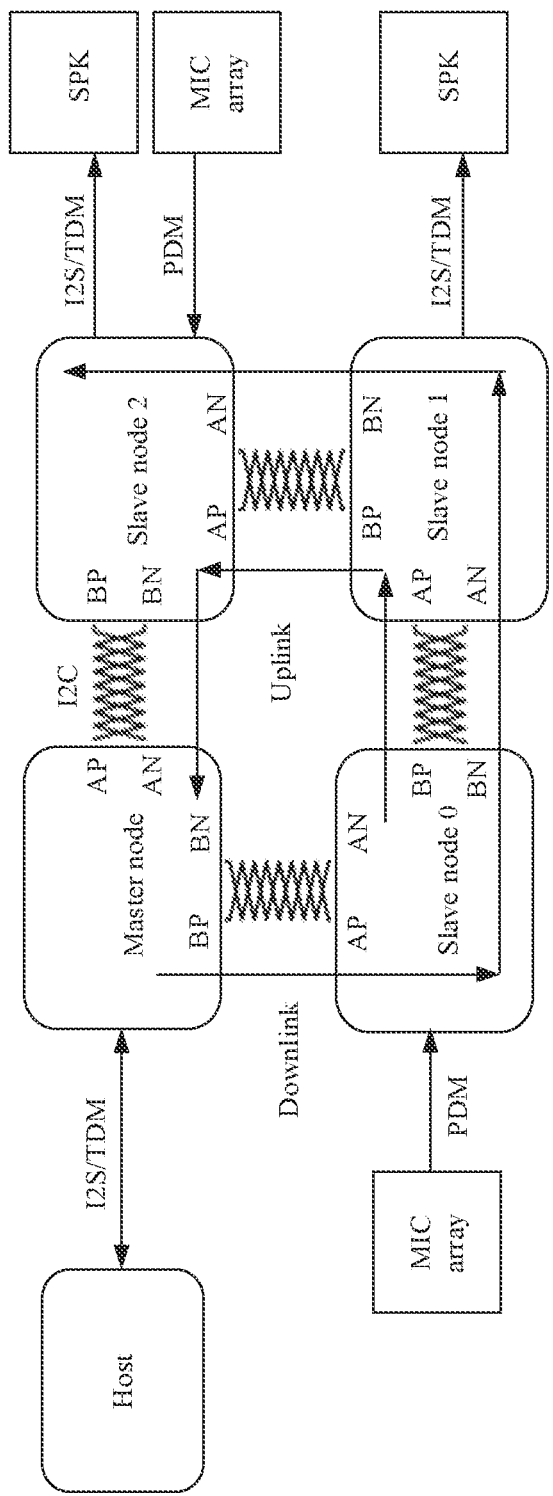
FIG. 14 is a schematic diagram of an emergency call system according to an embodiment of this application.

For example, as shown in FIG. 14, a master node, a slave node 0, a slave node 1, and a slave node 2 may form a ring network, and there are two transmission paths between the master node and the slave node 0 the master node—the slave node 0 and the master node—the slave node 2—the slave node 1—the slave node 0. Similarly, there are two transmission paths between the master node and the slave node 1 the master node—the slave node 0—the slave node 1 and the master node—the slave node 2—the slave node 1. Other transmission nodes are similar, which are not described one by one herein. It should be understood that FIG. 14 is merely an example for description. In a specific implementation, there may be another quantity of transmission nodes in the data communication system, and there may also be another connection relationship between the transmission nodes in the data communication system. For example, the slave node 1 is connected to the master node, and the master node, the slave node 0, and the slave node 1 may form a ring network. For another example, the slave node 2 is connected to the slave node 0, and the slave node 0, the slave node 1, and the slave node 2 may form a ring network. A quantity and a connection manner of the transmission nodes in the data communication system are not limited in this embodiment of this application.

Figure 15:
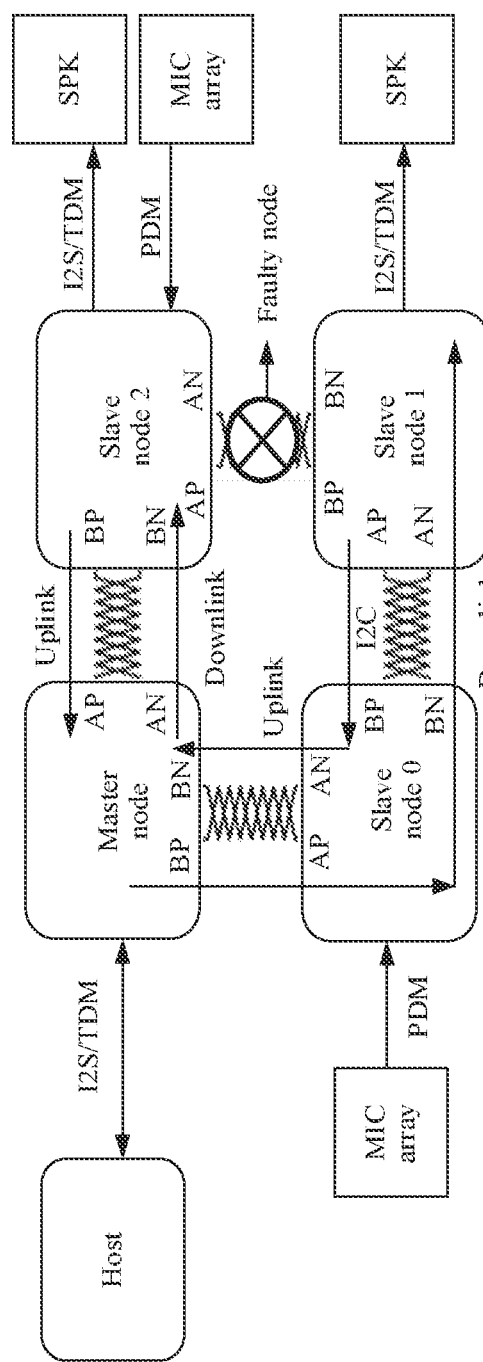
FIG. 15 is a schematic diagram of an emergency call apparatus according to an embodiment of this application.

FIG. 14 is used as an example. In normal working, downlink services of all transmission nodes in the data communication system may be transmitted in a counter-clockwise transmission link, to be specific, transmitted along the master node→the slave node 0→the slave node 1→the slave node 2, and uplink services may be transmitted in a clockwise transmission link, to be specific, transmitted along the slave node 0→the slave node 1→the slave node 2→the master node. When a link between the slave node 1 and the slave node 2 is faulty, a downlink service of the slave node 2 may be transmitted along a path of the master node→the slave node 2, an uplink service of the slave node 2 may be transmitted along the slave node 2→the master node, downlink services of the slave node 1 and the slave node 0 may be transmitted along the master node 0 the slave node 0→the slave node 1, and uplink services of the slave node 1 and the slave node→may be transmitted along the slave node 1→the slave node 0→the master node, as shown in FIG. 15. It can be learned that the slave node 0, the slave node 1, and the slave node 2 can all work normally, so that regardless of which transmission node the T-Box is connected to, when a transmission node or a link in the data communication system is faulty, the T-Box can still obtain data collected by a peripheral, to ensure normal running of an eCall function in the T-Box, and improve reliability of an eCall.

In Embodiment 4 of this application, path redundancy is provided for the T-Box. When the node or the link in the data communication system is faulty, the data communication system may supply power to the T-Box through a standby path, to drive the peripheral to work normally, and improve reliability of the eCall.

It should be noted that Embodiment 4 of this application may be implemented as an independent solution, or may be implemented as a solution combined with any one of Embodiments 1 to 3. For example, Embodiment 4 is combined with Embodiment 1. To be specific, the data communication system in Embodiment 1 may be connected in the networking manner in Embodiment 4. For another example, Embodiment 4 is combined with Embodiment 2. To be specific, the data communication system in Embodiment 2 may be connected in the networking manner in Embodiment 4. For another example, Embodiment 4 is combined with Embodiment 3. To be specific, in Embodiment 3, the first system may be connected in the networking manner in Embodiment 4, and the second system may also be connected in the networking manner in Embodiment 4.

Figure 16:
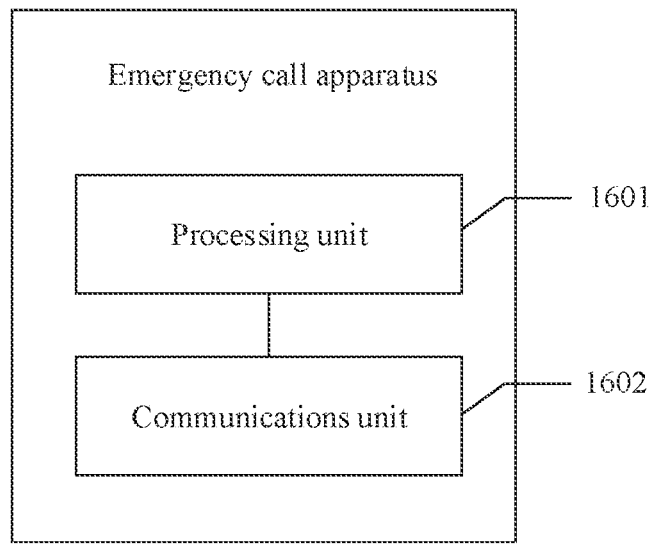
FIG. 16 is a schematic diagram of an emergency call apparatus according to an embodiment of this application.

Based on a same technical concept as the method embodiments, an embodiment of this application provides an emergency call apparatus. A structure of the apparatus may be shown in FIG. 16, and the apparatus includes a processing unit 1601 and a communications unit 1602.

In an implementation, the emergency call apparatus may further be configured to implement the method performed by the telematics box in the embodiments in FIG. 4, FIG. 5A, and FIG. 5B. The apparatus may be the telematics box, or a chip, a chipset, or a part of the chip in the telematics box, and the part of the chip is configured to perform a related method function. The processing unit 1601 is configured to activate a host function. The host function includes controlling a first transmission node and a peripheral connected to the first transmission node. The communications unit 1602 is configured to perform data transmission with the first transmission node. The first transmission node is in a master node mode.

In a possible implementation, the processing unit 1601 is further configured to, before the communications unit 1602 performs data transmission with the first transmission node, detect a signal for triggering an emergency call, or detect that a transmission path between the first transmission node and a primary transmission node in a data communication system is interrupted. The communications unit 1602 is further configured to send a first instruction to the first transmission node. The first instruction is used to instruct the first transmission node to switch from a slave node mode to a master node mode.

In a possible implementation, the communications unit 1602 is further configured to, before performing data transmission with the first transmission node, receive a second instruction sent by the first transmission node. The second instruction is used to implement synchronization between the apparatus and the first transmission node.

In another possible implementation, the communications unit 1602 is further configured to, before performing data transmission with the first transmission node, send a second instruction to the first transmission node. The second instruction is used to implement synchronization between the apparatus and the first transmission node.

The processing unit 1601 may further be configured to, before activating the host function, detect the signal for triggering an emergency call.

Alternatively, the processing unit 1601 may further be configured to, before activating the host function, detect that the transmission path between the first transmission node and the primary transmission node in the data communication system is interrupted.

Alternatively, the communications unit 1602 may further be configured to, before the processing unit 1601 activates the host function, receive a third instruction sent by the first transmission node. The third instruction is used to instruct the apparatus to activate the host function.

For example, the data communication system includes at least one second transmission node. The second transmission node is a lower-level transmission node of the first transmission node.

The processing unit 1601 may further be configured to, after activating the host function, allocate a transmission resource to the at least one second transmission node. The communications unit 1602 may further be configured to send resource allocation information to the first transmission node. The resource allocation information is used to indicate the transmission resource separately corresponding to the at least one second transmission node.

For example, the apparatus may switch from being powered by the first transmission node to being powered by a local power supply.

The apparatus may further supply power to the first transmission node.

The data communication system may further include a third transmission node, and the third transmission node is the primary transmission node in the data communication system. There are at least two transmission paths between the apparatus and the third transmission node.

In an implementation, the emergency call apparatus may further be configured to implement the method performed by the first transmission node in the embodiments in FIG. 4, FIG. 5A and FIG. 5B. The apparatus may be the first transmission node, or a chip, a chipset, or a part of the chip in the first transmission node, and the part of the chip is configured to perform a related method function. The processing unit 1601 is configured to control the apparatus to switch from a slave node mode to a master node mode. The communications unit 1602 is configured to perform data transmission with a telematics box. The telematics box has a host function, and the host function includes a function of controlling the apparatus and a peripheral connected to the apparatus.

In a possible implementation, the processing unit 1601 may further be configured to, before controlling the apparatus to switch from the slave node mode to the master node mode, detect a signal for triggering an emergency call.

In another possible implementation, the processing unit 1601 is further configured to, before controlling the apparatus to switch from the slave node mode to the master node mode, detect that a transmission path between the apparatus and a primary transmission node in a data communication system is interrupted.

In still another possible implementation, the communications unit 1602 is further configured to, before the processing unit 1601 controls the apparatus to switch from the slave node mode to the master node mode, receive a first instruction sent by the telematics box. The first instruction is used to instruct the apparatus to switch from the slave node mode to the master node mode.

The communications unit 1602 may further be configured to, before performing data transmission with the telematics box, send a second instruction to the telematics box, where the second instruction is used to implement synchronization between the apparatus and the telematics box, or before performing data transmission with the telematics box, receive a second instruction sent by the telematics box, where the second instruction is used to implement synchronization between the apparatus and the telematics box.

The processing unit 1601 may further be configured to, before the communications unit 1602 performs data transmission with the telematics box, detect the signal for triggering an emergency call, or detect that the transmission path between the apparatus and the primary transmission node in the data communication system is interrupted. The communications unit 1602 is further configured to send a third instruction to the telematics box. The third instruction is used to instruct the telematics box to activate the host function.

The data communication system may further include at least one second transmission node. The second transmission node is a lower-level transmission node of the apparatus. The communications unit 1602 may further be configured to, after the processing unit 1601 controls the apparatus to switch from the slave node mode to the master node mode, receive resource allocation information sent by the telematics box, where the resource allocation information is used to indicate a transmission resource of the at least one second transmission node, and separately send configuration information to the at least one second transmission node, where the configuration information is used to indicate the transmission resource corresponding to the second transmission node.

The apparatus may switch from being powered by the data communication system to being powered by the telematics box.

The data communication system may further include a third transmission node. The third transmission node is the primary transmission node in the data communication system. There may be at least two transmission paths between the apparatus and the third transmission node.

Division into modules in this embodiment of this application is an example, is merely logical function division, and may be other division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in the embodiments of this application, further refer to related descriptions in the method embodiments.

Figure 17:
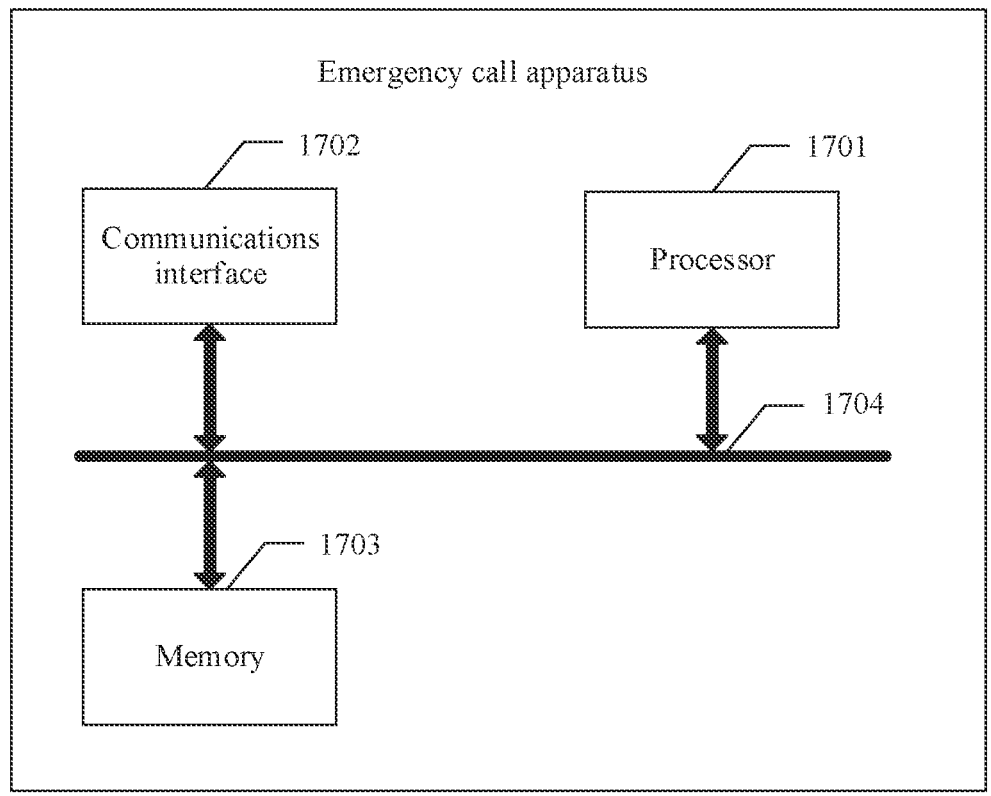
FIG. 17 is a schematic diagram of an emergency call apparatus according to an embodiment of this application.

In a possible implementation, the emergency call apparatus may be shown in FIG. 17. The apparatus may be a communications device or a chip in the communications device. The communications device may be a telematics box or a transmission node. The apparatus may include a processor 1701, a communications interface 1702, and a memory 1703. The processing unit 1601 may be the processor 1701. The communications unit 1602 may be the communications interface 1702.

The processor 1701 may be a central processing unit (CPU), a digital processing unit, or the like. The communications interface 1702 may be a transceiver, an interface circuit such as a transceiver circuit, a transceiver chip, or the like. The apparatus further includes the memory 1703, configured to store a program executed by the processor 1701. The memory 1703 may be a nonvolatile memory, for example, a hard disk drive (HDD) or a solid-state drive (SSD), or may be a volatile memory, for example, a RAM. The memory 1703 is any other medium that can be used to carry or store expected program code in a form of an instruction or a data structure and that can be accessed by a computer. However, this is not limited thereto.

The processor 1701 is configured to execute the program code stored in the memory 1703, and is further configured to perform an action of the processing unit 1601. Details are not described herein again in this application. The communications interface 1702 is further configured to perform an action of the communications unit 1602. Details are not described herein in this application.

In this embodiment of this application, a specific connection medium between the communications interface 1702, the processor 1701, and the memory 1703 is not limited. In this embodiment of this application, the memory 1703, the processor 1701, and the communications interface 1702 are connected through a bus 1704 in FIG. 17, and the bus is represented by a thick line in FIG. 17. A connection manner between other components is schematically described, and is not limited thereto. The bus may be classified into an address bus, a data bus, a control bus, and the like. For ease of representation, only one thick line is used to represent the bus in FIG. 17, but this does not mean that there is only one bus or only one type of bus.

An embodiment of this application further provides a computer-readable storage medium, configured to store a computer software instruction that needs to be executed for execution of the foregoing processor, and the computer-readable storage medium includes a program that needs to be executed for execution of the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Certainly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A communication method comprising:
    performing, by a telematics box that has not activated a host function of the telematics box and through a first transmission node that is coupled to the telematics box and that is in a slave node mode, first data transmission with a first host, wherein the host function of the telematics box comprises a function of controlling the first transmission node switched from the slave node mode to a master node mode;
    activating, by the telematics box, the host function of the telematics box that comprises the function of controlling the first transmission node switched from the slave node mode to the master node mode and controlling a peripheral coupled to the first transmission node, wherein activating the host function of the telematics box is based on detecting, by the telematics box, a signal for triggering a call, detecting that a transmission path between the first transmission node and a first master node in a data communication system has been interrupted, or receiving, by the telematics box, from the first transmission node, a first instruction instructing the telematics box to activate the host function of the telematics box; and
    performing, by the telematics box having activated the host function of the telematics box and after determining that the first transmission node has switched from the slave node mode to the master node mode, second data transmission with the first transmission node to receive data collected by the peripheral.

2. The communication method of claim 1, wherein before performing the second data transmission, the communication method further comprises sending, by the telematics box to the first transmission node, a second instruction instructing the first transmission node to switch from the slave node mode to the master node mode.

3. The communication method of claim 1, wherein before performing the second data transmission, the communication method further comprises:
    receiving, by the telematics box from the first transmission node, a second instruction instructing the telematics box to implement synchronization between the telematics box and the first transmission node; or
    sending, by the telematics box to the first transmission node, a third instruction instructing the first transmission node to implement the synchronization.

4. The communication method of claim 1, wherein after activating the host function of the telematics box, the communication method further comprises:
    allocating, by the telematics box, a transmission resource to a second transmission node that is a lower-level transmission node of the first transmission node; and
    sending, by the telematics box to the first transmission node, resource allocation information indicating the transmission resource.

5. The communication method of claim 1, wherein after activating the host function of the telematics box, the communication method further comprises switching, by the telematics box, from being powered by the first transmission node to being powered by a local power supply.

6. A communication method comprising:
    receiving, by a first transmission node in a slave node mode and through a first master node, data from a first host;
    switching, by the first transmission node, from the slave node mode to a master node mode;
    performing, by the first transmission node in the master node mode, data transmission with a telematics box that is coupled to the first transmission node and that has activated a host function of the telematics box, wherein the telematics box is distinct from the first master node; and
    undergoing, by the first transmission node in the master node mode, control through the host function of the telematics box,
    wherein before switching from the slave node mode to the master node mode, the communication method further comprises receiving, by the first transmission node and based on the telematics box detecting a signal for triggering a call, detecting that a transmission path between the first transmission node and the first master node has been interrupted, or receiving, by the telematics box from the first transmission node, a first instruction instructing the telematics box to activate the host function of the telematics box, a second instruction instructing the first transmission node to switch from the slave node mode to the master node mode to enable the first transmission node to send data collected by a peripheral to the telematics box.

7. The communication method of claim 6, wherein before performing the data transmission, the communication method further comprises:
    sending, by the first transmission node to the telematics box, a third instruction instructing the telematics box to implement synchronization between the first transmission node and the telematics box; or receiving, by the first transmission node from the telematics box, the third instruction instructing the first transmission node to implement the synchronization between the first transmission node and the telematics box.

8. The communication method of claim 6, wherein before performing the data transmission, the communication method comprises:
   detecting, by the first transmission node, the signal for triggering the call or detecting that the transmission path has been interrupted; and
   sending, by the first transmission node to the telematics box, the first instruction.

9. The communication method of claim 6, wherein after switching from the slave node mode to the master node mode, the communication method further comprises:
   receiving, by the first transmission node from the telematics box, resource allocation information indicating a transmission resource of a second transmission node that is a lower-level transmission node of the first transmission node; and
   sending, by the first transmission node to the second transmission node, configuration information indicating the transmission resource.

10. The communication method of claim 6, wherein after switching from the slave node mode to the master node mode, the communication method further comprises switching, by the first transmission node, from being powered by a data communication system to being powered by the telematics box, and wherein the first transmission node belongs to the data communication system.

11. The communication method of claim 6, wherein the first transmission node belongs to a data communication system, wherein the data communication system further comprises the first master node, and wherein at least two transmission paths exist between the first transmission node and the first master node.

12. A telematics box, comprising:
   one or more processors, and
   a memory coupled to the one or more processors and configured to store program instructions that, when executed by the one or more processors, cause the telematics box to:
      perform, by the telematics box that has not activated a host function of the telematics box and through a first transmission node that is coupled to the telematics box and that is in a slave node mode, first data transmission with a first host, wherein the host function of the telematics box comprises a function of controlling the first transmission node switched from the slave node mode to a master node mode;
      activate the host function of the telematics box that comprises the function of controlling the first transmission node switched from the slave node mode to the master node mode and controlling a peripheral coupled to the first transmission node, wherein activating the host function of the telematics box is based on detecting, by the telematics box, a signal for triggering a call, detecting that a transmission path between the first transmission node and a first master node in a data communication system has been interrupted, or receiving, by the telematics box, from the first transmission node, a first instruction instructing the telematics box to activate the host function of the telematics box; and
      perform, by the telematics box that has activated the host function of the telematics box, second data transmission with the first transmission node after determining that the first transmission node has switched from the slave node mode to the master node mode to receive data collected by the peripheral.

13. The telematics box of claim 12, wherein before performing the second data transmission, when executed by the one or more processors, the program instructions further cause the telematics box to send, to the first transmission node, a second instruction instructing the first transmission node to switch from the slave node mode to the master node mode.

14. The telematics box of claim 12, before performing the second data transmission, when executed by the one or more processors, the program instructions further cause the telematics box to:
   receive, from the first transmission node, a second instruction instructing the telematics box to implement synchronization between the telematics box and the first transmission node; or
   send, to the first transmission node, a third instruction instructing the first transmission node to implement the synchronization.

15. The telematics box of claim 12, wherein after activating the host function of the telematics box, when executed by the one or more processors, the program instructions further cause the telematics box to:
   allocate a transmission resource to a second transmission node that is a lower-level transmission node of the first transmission node; and
   send, to the first transmission node, resource allocation information indicating the transmission resource.

16. The telematics box of claim 12, when after activating the host function of the telematics box, when executed by the one or more processors, the program instructions cause the telematics box to switch from being powered by the first transmission node to being powered by a local power supply.

17. A first transmission node, comprising:
   one or more processors, and
   a memory coupled to the one or more processors and configured to store program instructions that, when executed by the one or more processors, cause the first transmission node to:
      perform, through a first master node, first data transmission between the first transmission node in a slave node mode and a first host;
      receive, based on a telematics box detecting a signal for triggering a call, detecting that a transmission path between the first transmission node and the first master node has been interrupted, or receiving, by the telematics box from the first transmission node, a first instruction instructing the telematics box to activate a host function of the telematics box, a second instruction instructing the first transmission node to switch from the slave node mode to a master node mode to enable the first transmission node to send data collected by a peripheral to the telematics box;
      switch a mode of the first transmission node from the slave node mode to the master node mode;
      perform, by the first transmission node in the master node mode, second data transmission between the first transmission node in the master node mode and the telematics box that has activated the host function of the telematics box, wherein the telematics box is distinct from the first master node; and undergo control through the host function of the telematics box when the first transmission node is in the master node mode.

18. The first transmission node of claim 17, wherein before performing the second data transmission, when executed by the one or more processors, the program instructions further cause the first transmission node to:
   send, to the telematics box, an instruction instructing the telematics box to implement synchronization between the first transmission node and the telematics box; or
   receive, from the telematics box, an instruction instructing the first transmission node to implement the synchronization between the first transmission node and the telematics box.

19. The first transmission node of claim 17, wherein before performing the second data transmission, when executed by the one or more processors, the program instructions further cause the first transmission node to:
   detect the signal for triggering the call;
   detect that the transmission path has been interrupted; or
   send, to the telematics box, the first instruction.

20. The first transmission node of claim 17, wherein when executed by the one or more processors, the program instructions further cause the first transmission node to:
   receive, from the telematics box, resource allocation information indicating a transmission resource of a second transmission node that is a lower-level transmission node of the first transmission node; and
   send, to the second transmission node, configuration information indicating the transmission resource.

21. The first transmission node of claim 17, wherein the first transmission node belongs to a data communication system, wherein the data communication system further comprises the first master node, and wherein at least two transmission paths exist between the first transmission node and the first master node.

\* \* \* \* \*